(12) United States Patent
Feng et al.

(10) Patent No.: US 7,761,619 B2
(45) Date of Patent: Jul. 20, 2010

(54) METHOD AND SYSTEM FOR PARALLELIZING COMPLETION EVENT PROCESSING

(75) Inventors: Shuangtong Feng, Redmond, WA (US); James T. Pinkerton, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 11/128,511

(22) Filed: May 13, 2005

(65) Prior Publication Data

US 2006/0259661 A1 Nov. 16, 2006

(51) Int. Cl.
*G06F 5/00* (2006.01)
*G06F 21/00* (2006.01)
*G06F 13/00* (2006.01)
*G06F 13/24* (2006.01)
*G06F 15/00* (2006.01)

(52) U.S. Cl. .............................. 710/52; 711/6; 711/170; 710/33; 710/263; 712/217

(58) Field of Classification Search ..................... 710/52
See application file for complete search history.

(56) References Cited

U.S. PATENT DOCUMENTS

| 5,872,941 | A | 2/1999 | Goodrum et al. |
| 6,041,060 | A * | 3/2000 | Leichty et al. ............... 370/412 |
| 6,594,712 | B1 * | 7/2003 | Pettey et al. .................... 710/22 |
| 6,874,054 | B2 * | 3/2005 | Clayton et al. ............... 710/310 |
| 7,006,436 | B1 | 2/2006 | Chu et al. |
| 7,095,750 | B2 | 8/2006 | Craddock et al. |
| 7,177,941 | B2 | 2/2007 | Biran et al. |
| 2001/0051972 | A1 | 12/2001 | Eydelman et al. |
| 2002/0098840 | A1 | 7/2002 | Hanson et al. |
| 2003/0014544 | A1 | 1/2003 | Pettey |
| 2003/0018787 | A1 | 1/2003 | Neal et al. |
| 2003/0065856 | A1 * | 4/2003 | Kagan et al. ................. 710/263 |
| 2003/0202519 | A1 | 10/2003 | Beukema et al. |
| 2004/0010545 | A1 | 1/2004 | Pandya |
| 2004/0010612 | A1 * | 1/2004 | Pandya ........................ 709/230 |

(Continued)

OTHER PUBLICATIONS

Extended European Search Report from European Application No. 06752537.8, dated Dec. 11, 2009.

(Continued)

*Primary Examiner*—Henry W. H. Tsai
*Assistant Examiner*—Juanito C Borromeo
(74) *Attorney, Agent, or Firm*—Wolf, Greenfield & Sacks, P.C.

(57) ABSTRACT

Disclosed are methods for handling RDMA connections carried over packet stream connections. In one aspect, I/O completion events are distributed among a number of processors in a multi-processor computing device, eliminating processing bottlenecks. For each processor that will accept I/O completion events, at least one completion queue is created. When an I/O completion event is received on one of the completion queues, the processor associated with that queue processes the event. In a second aspect, semantics of the interactions among a packet stream handler, an RDMA layer, and an RNIC are defined to control RDMA closures and thus to avoid implementation errors. In a third aspect, semantics are defined for transferring an existing packet stream connection into RDMA mode while avoiding possible race conditions. The resulting RNIC architecture is simpler than is traditional because the RNIC never needs to process both streaming messages and RDMA-mode traffic at the same time.

19 Claims, 20 Drawing Sheets

U.S. PATENT DOCUMENTS

| | | |
|---|---|---|
| 2004/0013112 A1 | 1/2004 | Goldberg et al. |
| 2004/0049600 A1 | 3/2004 | Boyd et al. |
| 2004/0073622 A1 | 4/2004 | McDaniel et al. |
| 2004/0263891 A1 | 12/2004 | Yamada et al. |
| 2005/0135173 A1 | 6/2005 | Fan |
| 2006/0080451 A1 | 4/2006 | Eckert |
| 2006/0101225 A1 | 5/2006 | Aloni et al. |
| 2006/0259661 A1 | 11/2006 | Feng et al. |

OTHER PUBLICATIONS

Written Opinion from International Application No. PCT/US06/18623, dated Aug. 31, 2007.

International Preliminary Report on Patentability from International Application No. PCT/US06/18623, dated Nov. 14, 2007.

* cited by examiner

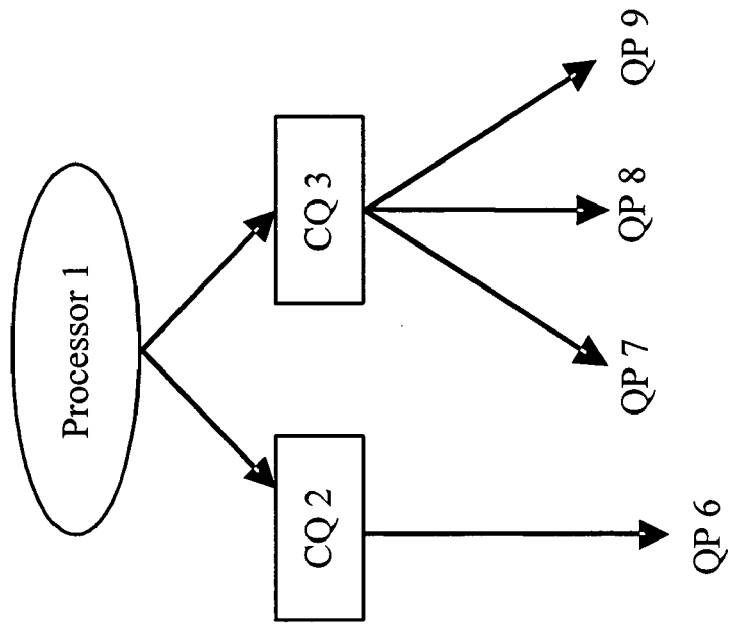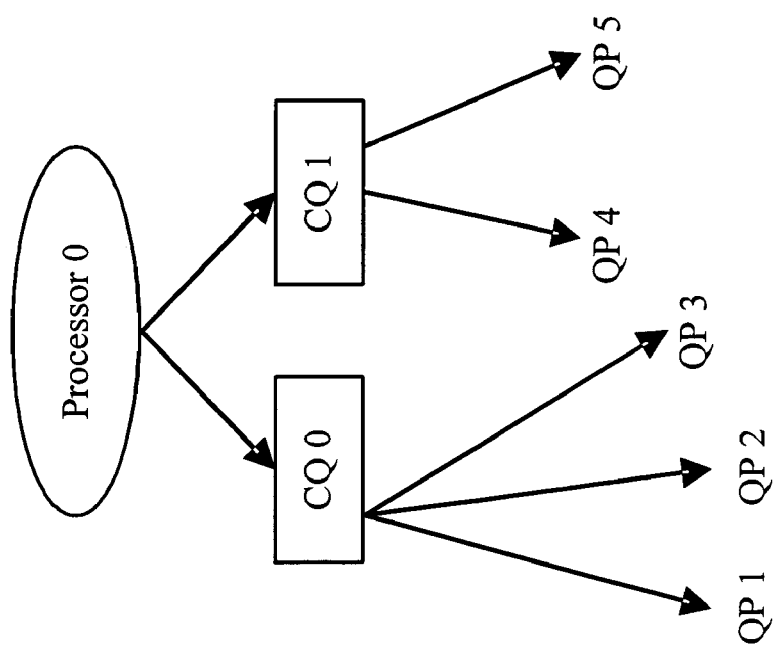
FIG. 8

METHOD AND SYSTEM FOR PARALLELIZING COMPLETION EVENT PROCESSING

RELATED APPLICATIONS

The present application is related to U.S. Patent Applications "Method and System for Closing an RDMA Connection," Ser. No. 11/128,875, and "Method and System for Transferring a Packet Stream to RDMA," Ser. No. 11/128,710.

TECHNICAL FIELD

The present invention is related generally to remote direct memory access (RDMA), and, more particularly, to local processing of RDMA connections carried over packet streams.

BACKGROUND OF THE INVENTION

DMA (direct memory access) is a traditional technology that moves or copies items from one place to another in the dynamic memory of a computing device while using only a small amount or none of the resources of the computing device's central processing unit. RDMA extends this concept and moves or copies memory items from one computing device to another. In high-speed networking and in high-performance computing environments, RDMA is expected to become increasingly invaluable. For example, data centers and server farms will rely on RDMA to coordinate computing devices connected by networks running packet protocols, such as TCP.

Due to the great commercial value of RDMA, various aspects of it are being standardized by, for example, the RDMA Consortium. However, these efforts do not as yet adequately address all of the areas of RDMA processing that are significant for producing the efficiencies promised by RDMA. For example, RDMA connections are often of long duration and often require intensive use of local input/output (I/O) resources. When a single computing device is called upon to support multiple, simultaneous RDMA connections, the local processing involved can overwhelm the resources of the computing device, leading to a bottleneck and to RDMA transfer inefficiencies.

In another area of concern, the network interface controller (NIC) that supports the RDMA connection protocol can get confused or overwhelmed because it also supports the underlying network packet protocol. Coordinating these two protocols with their disparate demands, and coordinating both with the operating system of the computing device, leads to complex problems and error-prone implementations. Most critically, problems can arise either when closing an existing RDMA connection or when initiating an RDMA connection on top of an existing packet stream.

The above are just a few examples of the areas of concern left to be addressed before RDMA can achieve its full potential.

SUMMARY OF THE INVENTION

In view of the foregoing, the present invention provides techniques for efficiently processing I/O completion events by distributing those events among a number of processors in a multi-processor computing device. For each processor that will accept I/O completion events (not all processors in the computing device need participate in this), at least one I/O completion queue is created. Each completion queue supports one or more RDMA connections. When an I/O completion event is received on one of the completion queues, the processor associated with that queue processes the event. In this manner, multiple processors simultaneously handle multiple completion events, eliminating processing bottlenecks.

In some embodiments, each participating processor is assigned a unique identifier. When an interface comes up, an interface queue is created for that interface. The interface queue contains an array of descriptors, one descriptor for each participating processor. Each descriptor also stores an identifier of the completion event handler for its processor. Whenever a new completion queue is created, it is bound to one of the completion event handlers and thus to one of the participating processors.

Whenever a new completion queue is created, a load-balancing algorithm can be run to decide which participating processor will be given responsibility for events coming in on the new completion queue. Many load-balancing algorithms are known in the art and can be applied here.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 8 is a schematic diagram of completion queues and queue pairs on a multi-processor computing device;

DETAILED DESCRIPTION OF THE INVENTION

Figure 1:
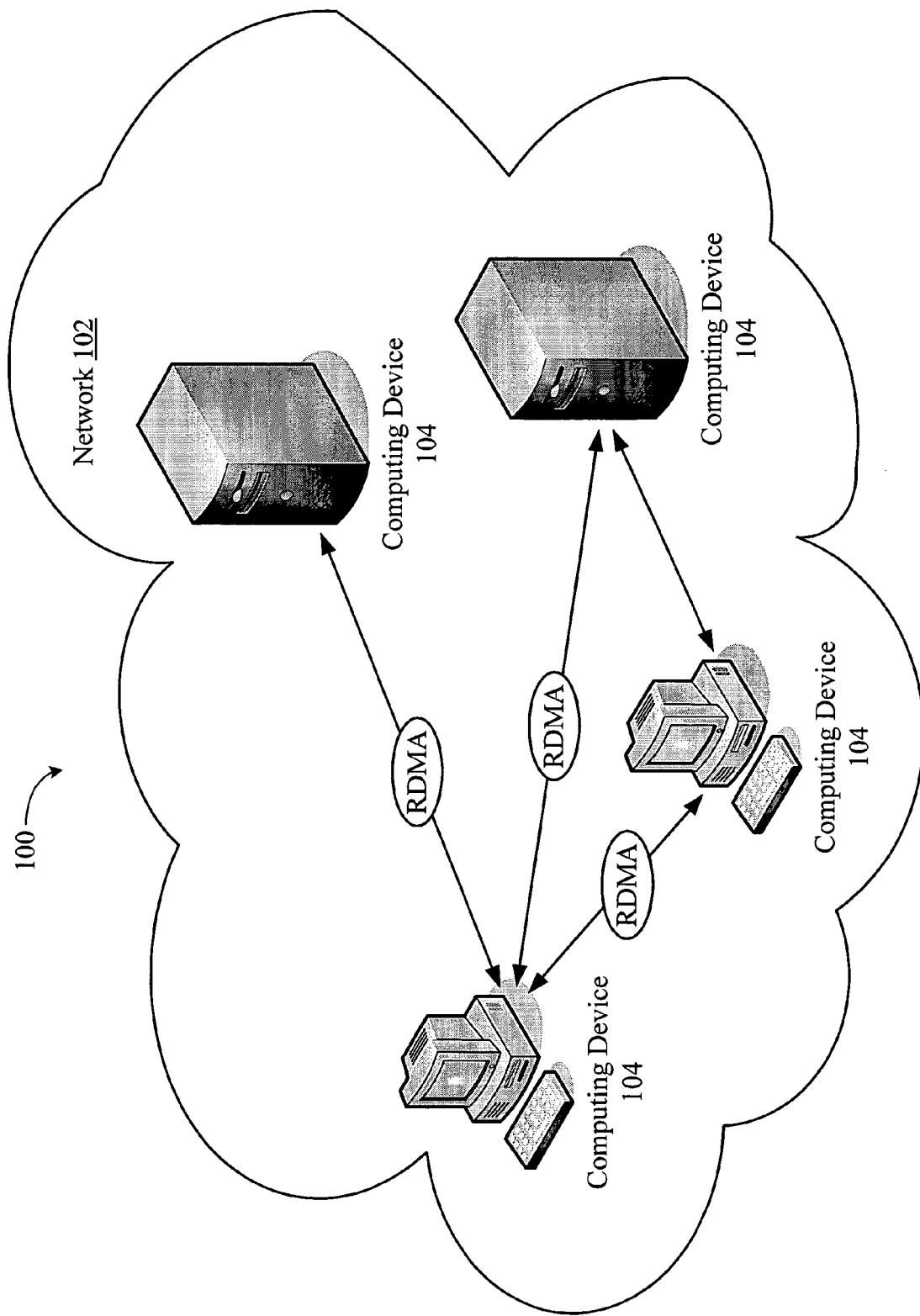
FIG. 1 is a block diagram of an exemplary networking environment with computing devices sharing data via RDMA.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the environment surrounding the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Introduction

RDMA is a recently developing technology that enables one computer to access the memory of a remote peer directly with little or no processor overhead. RDMA enables zero-copy sends and receives over a conventional packet network, e.g., over a TCP (Transmission Control Protocol) stream.

FIG. 1 shows an RDMA networking environment 100 in which a network 102 connects four computing devices 104. The computing devices 104 use their network 102 connections to perform RDMA transfers with each other. The network 102 can be, for example, a locally managed corporate LAN (local area network) or the Internet.

FIG. 1 is meant merely to introduce the RDMA actors and their inter-relationships for the sake of the following discussion. Consequently, the portrayed RDMA environment 100 is greatly simplified. Because some aspects of RDMA are well known in the art, these aspects, such as authentication schemes and security, are not discussed here. The intricacies involved in setting up and running a successful RDMA environment 100 are well known to those working in this field.

Figure 2:
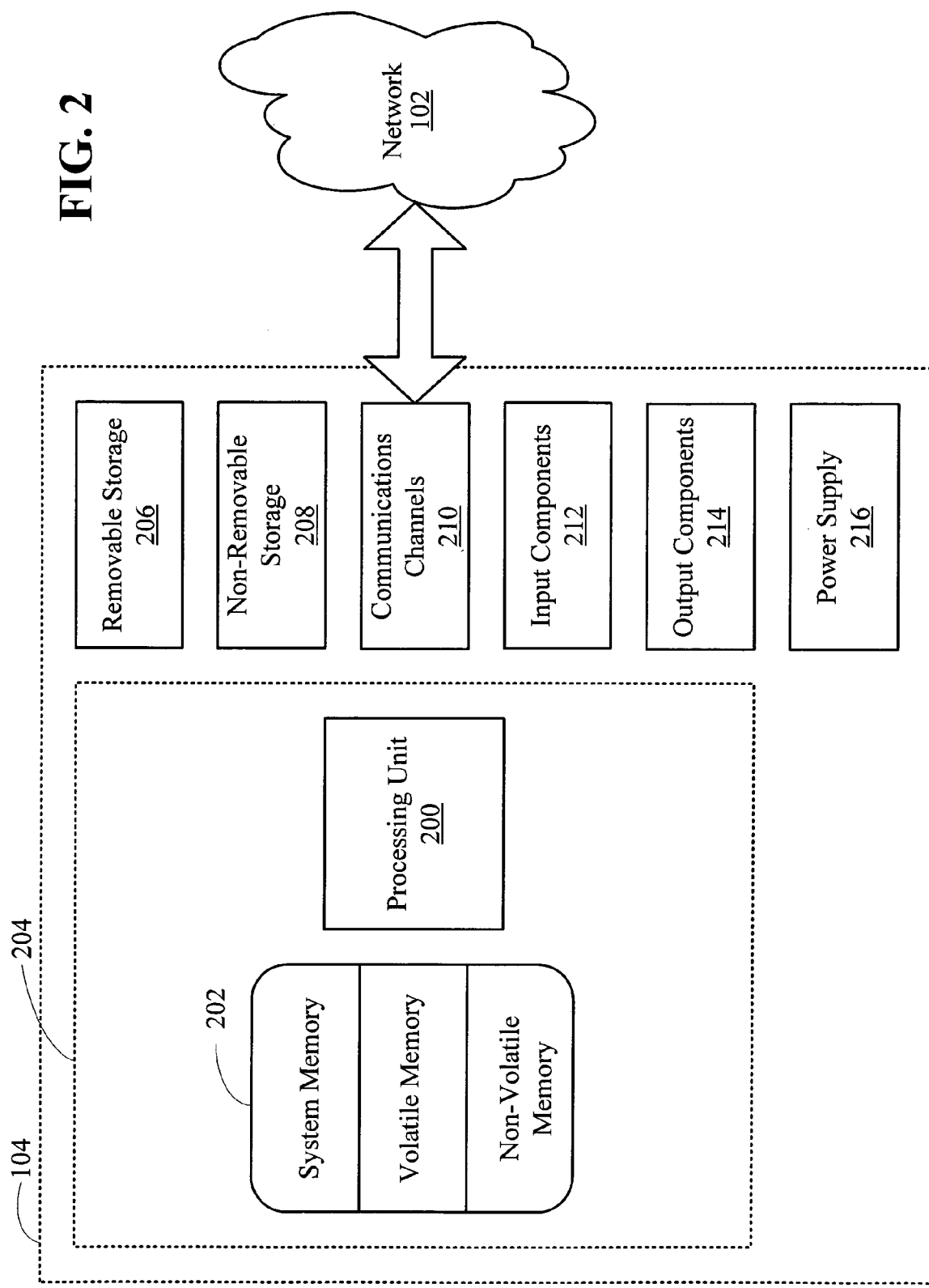
FIG. 2 is a schematic diagram generally illustrating an exemplary computing device that supports the present invention.

The computing device 104 of FIG. 1 may be of any architecture. FIG. 2 is a block diagram generally illustrating an exemplary computer system that supports the present invention. The computer system of FIG. 2 is only one example of a suitable environment and is not intended to suggest any limitation as to the scope of use or functionality of the invention. Neither should the computing device 104 be interpreted as having any dependency or requirement relating to any one or combination of components illustrated in FIG. 2. The invention is operational with numerous other general-purpose or special-purpose computing environments or configurations. Examples of well known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs, minicomputers, mainframe computers, and distributed computing environments that include any of the above systems or devices. In its most basic configuration, the computing device 104 typically includes at least one processing unit 200 and memory 202. The memory 202 may be volatile (such as RAM), non-volatile (such as ROM or flash memory), or some combination of the two. This most basic configuration is illustrated in FIG. 2 by the dashed line 204. The computing device 104 may have additional features and functionality. For example, it may include additional storage (removable and non-removable) including, but not limited to, magnetic and optical disks and tape. Such additional storage is illustrated in FIG. 2 by removable storage 206 and by non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing device 104. Any such computer-storage media may be part of the computing device 104. The computing device 104 may also contain communications channels 210 that allow it to communicate with other devices, including devices on the network 102. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include optical media, wired media, such as wired networks and direct-wired connections, and wireless media such as acoustic, RF, infrared, and other wireless media. The term "computer-readable media" as used herein includes both storage media and communications media. The computing device 104 may also have input devices 212 such as a touch-sensitive display screen, a hardware keyboard, a mouse, a voice-input device, etc. Output devices 214 include the devices themselves, such as the touch-sensitive display screen, speakers, and a printer, and rendering modules (often called "adapters") for driving these devices. All these devices are well know in the art and need not be discussed at length here. The computing device 104 has a power supply 216.

The following definitions are helpful in discussing RDMA.

Consumer: The kernel-mode user of the Winsock Kernel (WSK) or the RAL Proxy.

Data Sink: The peer computing device receiving a data payload. Note that the Data Sink can be required to both send and receive RDMA/DDP (Direct Data Placement) Messages to transfer a data payload.

Data Source: The peer computing device sending a data payload. Note that the Data Source can be required to both send and receive RDMA/DDP Messages to transfer a data payload.

Invalidate STag: A mechanism used to prevent the Remote Peer from reusing a previously explicitly advertised STag until the Local Peer makes it available again through a subsequent explicit Advertisement.

iWARP: A suite of wire protocols that includes RDMAP (RDMA Protocol), DDP, and MPA (Marker PDU Aligned Framing). The iWARP protocol suite may be layered above TCP, SCTP (Stream Control Transmission Protocol), or other transport protocols.

Local Peer: The RDMA/DDP protocol implementation on the local end of a connection. It is used to refer to the local entity when describing a protocol exchange or other interaction between two computing devices.

Messages: An application record is transmitted from the Data Source to the Data Sink, preserving record boundaries and using buffers that have not been advertised from the Data Sink to the Data Source. This is one of the three traditional RDMA modes (along with RDMA Read and RDMA Write) for transferring data.

RDMA Read: An RDMA Operation used by the Data Sink to transfer the contents of a source RDMA buffer from the Remote Peer to the Local Peer. An RDMA Read operation consists of a single RDMA Read Request Message and a single RDMA Read Response Message. This is one of the three traditional RDMA modes for transferring data.

RDMA Write: An RDMA Operation that transfers the contents of a source RDMA Buffer from the Local Peer to a destination RDMA Buffer at the Remote Peer using RDMA. The RDMA Write Message only describes the Data Sink RDMA buffer. This is one of the three traditional RDMA modes for transferring data.

RDMA: A method of accessing memory on a remote system in which the local system specifies the remote location of the data to be transferred. Employing an RNIC in the remote system allows the access to take place without interrupting the processing of the CPU(s) on the system.

Remote Peer: The RDMA/DDP protocol implementation on the opposite end of the connection. It is used to refer to the remote entity when describing protocol exchanges or other interactions between two computing devices.

RNIC: An RDMA Network Interface Controller is a network I/O adapter or embedded controller with iWARP and verbs functionality.

RNIC Interface (RI): The presentation of the RNIC to the verbs' consumer as implemented through the combination of the RNIC and the RNIC driver.

Send: An RDMA Operation that transfers the contents of a ULP (upper layer protocol) Buffer from the Local Peer to an Untagged Buffer at the Remote Peer.

Steering Tag (also STag): An identifier of a Tagged Buffer on a node, valid as defined within a protocol specification.

Tagged Buffer: A buffer that is explicitly Advertised to the Remote Peer through the exchange of an STag, Tagged Offset, and length.

Untagged Buffer: A buffer that is not explicitly Advertised to the Remote Peer.

Verbs: An abstract description of the functionality of an RNIC Interface. The OS (operating system) may expose some or all of this functionality via one or more APIs (application programming interfaces) to applications. The OS also uses some of this functionality to manage the RNIC Interface.

Overview of an Exemplary RDMA Architecture

Figure 3:
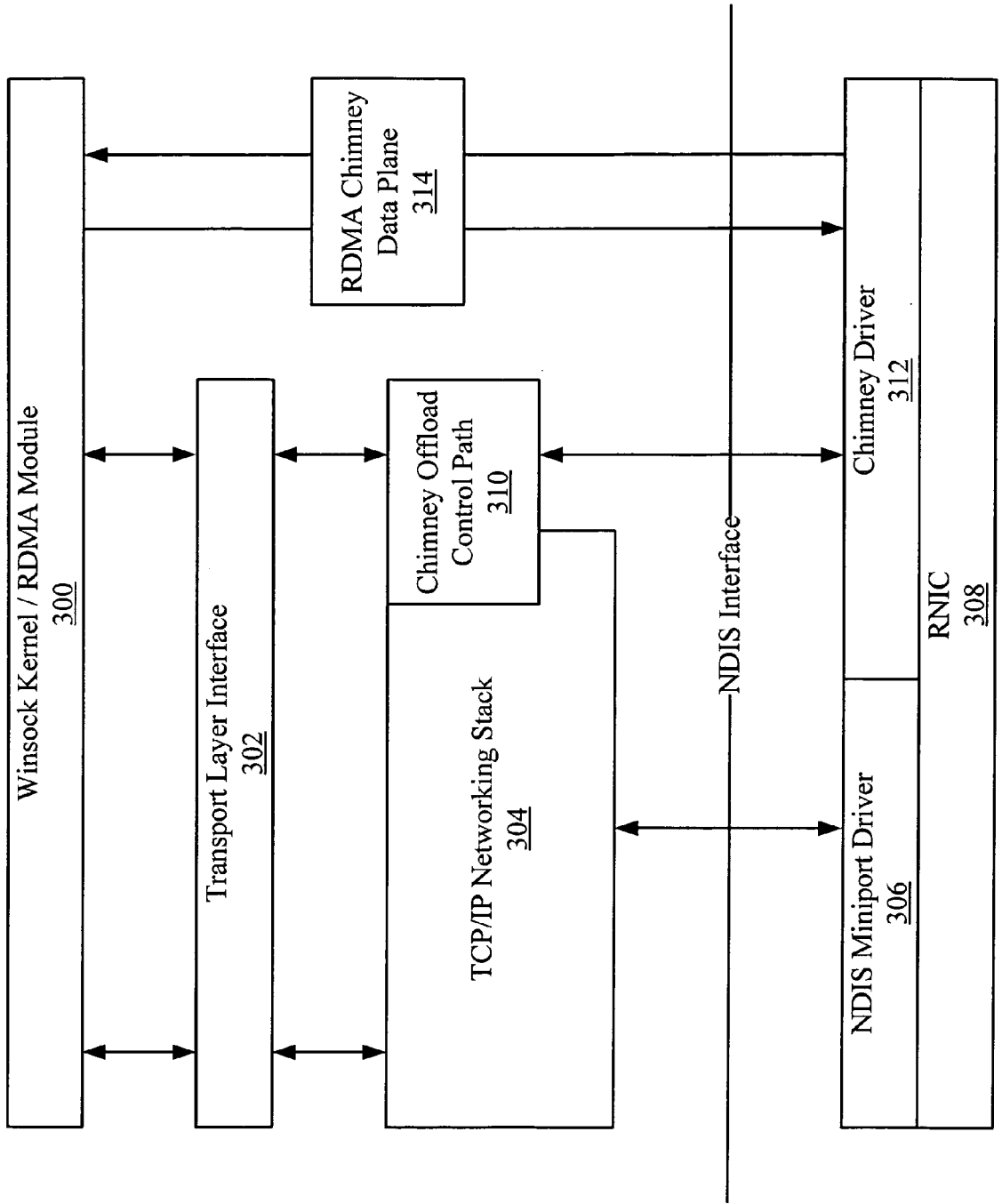
FIG. 3 is a schematic diagram of an exemplary architecture that supports RDMA connections.

FIG. 3 presents an overview of a "Chimney Architecture" as one example of an architecture that supports RDMA. The RDMA Module 300 has two consumers: the WSK and the RAL Proxy (not shown in FIG. 3 but "above" the RDMA Module 300). The exemplary architecture of FIG. 3 leverages existing TCP chimney mechanisms to perform RDMA offload and upload requests. In the RDMA chimney, states are updated as they are in the TCP chimney where any cached state may be updated while the connection is offloaded, but a delegated state cannot be modified unless the RDMA connection is uploaded. The RDMA chimney is negotiated with the chimney driver 312 through NDIS (Network Driver Interface Specification).

While similar, the RDMA chimney differs from the traditional TCP chimney offload architecture in several important aspects.

For TCP, connections are usually established and some data transfer occurs before an offload is initiated. Thus the software stack has a TCP state that should be transferred to the NIC 308. For RDMA, in contrast, once an application decides to start using RDMA (on an already established TCP connection), the connection is immediately offloaded. Thus there is little RDMA state present in the stack.

The TCP/IP (Internet Protocol) offload state is split into three categories: Constant, Cached, and Delegated. In contrast, most RDMA state is Delegated.

If a TCP connection has been offloaded and converted to the RDMA mode, then it will stay in the RDMA mode for the lifetime of the connection.

For now, the only uploaded state supported is for a closed connection: QP (queue pair) state is Idle.

The RDMA Module 300 includes an RDMA Off-Load Manager (ROLM) (not shown in FIG. 3). The ROLM performs the following functions (see a later section for exemplary implementation details):

It initializes devices and software with NDIS and with the RNIC miniport. The details of the ROLM's mechanisms and the data structures that are used during initialization are described below.

The ROLM manages resources: (1) It manages STags; (2) It reserves resources before an offload is started, including creating and configuring PDs (protection domains), CQs (completion queues), and QPs; and (3) It cleans up resources when an offload is complete.

The ROLM provisions RDMA statistics through an SNMP MIB (Simple Network Management Protocol Management Information Base). Certain RDMA statistics are collected and reported to a user through the SNMP MIB.

RDMA exposes a number of configuration options to system administrators so that they can specify the following options on an RNIC 308: Allow/Disallow RDMA operations on certain TCP ports, Allow/Disallow in-coming RDMA requests from certain IP addresses, and Disable/Enable RDMA on the RNIC 308.

The following is a brief overview of the semantics of the WSK API RDMA programming model. There are guarantees and constraints to ensure the proper ordering of a user's RDMA operations. The user can also request fence indicators on certain RDMA operations. All calls are asynchronous.

WskRdmaMapAndSend: Implements the RDMA Send and Send with Invalidate. This function allows a local buffer to be specified as either a WSK_BUF (MDL) or a scatter/gather list (SGL) of STag/Offset/Length. It allows a user to give an invalid STag, and this function will map this STag through PostSQ verb and then do an RDMA Send.

WskRdmaRecv: Receives an RDMA Send Type Message. The buffer is posted to the QP's RQ (receive queue). The buffer can be specified as either a WSK_BUF or an SGL of STag/Offset/Length.

WskRdmaGet: Implements the RDMA Read operation. This API is used to issue an RDMA Read request to the remote peer. The completion of this API signals that the read operation has completed and the data are available. WskRdmaGet supports an SGL of either WSK_BUF or STag/Offset/Length and generates multiple RDMA Reads if multiple scatter/gather entries are posted.

WskRdmaPut: Implements the RDMA Write operation. This call is used to issue an RDMA Write request to the remote peer. Because the WskRDMAPut has no completion semantics on the remote peer, after the call completes locally the application would typically send a ULP-specific message using WskRdmaSend( ) to notify the remote peer that data were transferred through the WskRdmaPut operation.

WskRdmaMapBuffer: Implements RDMA memory registration operations and returns an STag to the user. The STag is always a Memory Region STag. The user of this API can specify what type of STag to generate by setting appropriate flags. The returned STag is in the valid state and is ready to be used for future RDMA data transfer operations.

WskRdmaInvalidateMap: Implements the RDMA memory invalidation operation. It takes in an STag and invalidates that STag (sets its state to Invalid) using the PostSQ Invalidate operation.

WskRdmaAllocateSTag: Implements the RDMA Allocate STag Verb. It takes in the number of entries (physical pages) the map should support and returns an STag in the Invalid state.

WskRdmaDeallocateSTag: Implements the RDMA Deallocate STag Verb. It takes in an STag and deallocates it (whether the STag was created with WskRdmaMapBuffer or with WskRdmaAllocate).

Ioctls: Several Ioctls are provided by the WSK RDMA interface to an application so that it can manipulate the RDMA state: (1) SIO_RDMA_RESERV_RESOURCE is called to reserve RDMA resources before RDMA connection setup (PD, CQ, and QP) and (2) SIO_RDMA_SWITCH_TO_RDMA_MODE is called to switch an existing connected socket (in stream mode) to RDMA mode.

The RAL proxy interface interacts with the SDP (Sockets Direct Protocol) to enable kernel-bypass RDMA. The interface to the RAL Proxy is a control interface, thus it is significantly more sophisticated than the WSK API. The RAL Proxy control interface allows the RAL Proxy to directly manipulate PDs, CQ, Memory Windows, and STags for locally accessed buffers. However, all other constraints of the WSK API apply, such as ordering constraints. Note that data transfer is not done through this control interface: a QP is set up for direct user-mode access, so all send and receive data are communicated directly from and to the RNIC 308 by the user-mode application.

The RDMA Module 300 uses the Transport Layer Interface 302 interface to talk with the TCP chimney module 310 to start and terminate (or upload) a TCP connection. Once the connection is offloaded to the RNIC 308, the RDMA Module 300 interacts directly with the NDIS Miniport Driver 306 to access the RNIC miniport. To support the RAL Proxy, the RDMA Module 300 can add and remove TCP Listen requests through the Transport Layer Interface 302.

Specifics of an Exemplary RDMA Architecture

Initialization

There are three parts to the RNIC Initialization with NDIS: (1) advertising RNIC offload capabilities, (2) advertising offload handlers, and (3) providing call handlers.

(1) NDIS obtains offload capabilities from the miniport by calling the MINIPORT_REQUEST_HANDLER to query the RNIC miniport's capabilities at initialization time. NDIS issues NdisRequest to query information with OID_TCP_OFFLOAD_TASK. The RNIC miniport returns a list of offload tasks supported by this RNIC through the completion routine. At the end of the offload task list, there is a task structure whose task type equals RdmaChimneyOffloadNdisTask. The TaskBuffer field of that task structure contains the NDIS_TASK_RDMA_OFFLOAD structure. This structure contains a list of variables that the RNIC advertises according to the verb specification.

(2) The miniport advertises its dispatch routines (offload handlers) to NDIS. There are two types of chimney offload handlers: generic offload handlers and chimney-specific offload handlers. Generic chimney offload handlers (and their completion handlers) are shared across all types of chimneys. They include InitiateOffload, TerminateOffload, UpdateOffload, and QueryOffload. Because an RDMA chimney is built upon a TCP chimney, RDMA offload uses the same set of generic offload handlers as does the TCP chimney. Generic offload handlers are advertised to NDIS when the miniport initializes its TCP chimney. Chimney-specific offload handlers are specific to one type of chimney and are advertised to NDIS individually by different chimneys. The RDMA chimney defines RDMA-specific offload handlers for some of the most frequently used verbs, e.g., Post SQ and Post RQ. For RDMA, most of the Update and Query type of verbs are "embedded" into the two RDMA-specific offload handlers RdmaOffloadUpdateHandler and RdmaOffloadQueryHandler. For example, Query QP is implemented as an opcode of the RdmaOffloadQueryHandler.

To set RDMA-specific offload handlers, the miniport calls NdisSetOptionalHandlers.

```
NDIS_STATUS
NdisSetOptionalHandlers
(
    NDIS_HANDLE                        NdisHandle,
    PNDIS_DRIVER_OPTIONAL_HANDLERS     OptionalHandlers
)
```

NdisHandle is the handle given to the miniport when it registered with NDIS.

OptionalHandlers are RDMA-specific offload handlers that the miniport wants to give to NDIS.

The following structure is defined for the miniport to store RDMA-specific offload handlers. The miniport sets the following fields before passing the structure into the above function: the Type field of the NDIS_OBJECT_HEADER is set to NDIS_OBJECT_TYPE_PROVIDER_CHIMNEY_OFFLOAD_CHARACTERISTICS; the field OffloadType is set to NdisRdmaChimneyOffload; and RDMA-specific offload handlers are set to corresponding miniport dispatch routines.

```
typedef struct _NDIS_PROVIDER_CHIMNEY_OFFLOAD_RDMA_CHARACTERISTICS
{
    NDIS_OBJECT_HEADER Header;
    // Header.Type = NDIS_OBJECT_TYPE_PROVIDER_CHIMNEY_OFFLOAD_CHARACTERISTICS
    ULONG Flags;
    // Not used by NDIS for now.
    NDIS_CHIMNEY_OFFLOAD_TYPE OffloadType;
    // Set this field to NdisRdmaChimneyOffload.
    //RDMA-specific offload handlers go here:
    MINIPORT_RDMA_OFFLOAD_POST_SQ_HANDLER       RdmaOffloadPostSQHandler;
    MINIPORT_RDMA_OFFLOAD_POST_RQ_HANDLER       RdmaOffloadPostRQHandler;
    MINIPORT_RDMA_OFFLOAD_POLL_CQ_HANDLER       RdmaOffloadPollCQHandler;
    MINIPORT_RDMA_OFFLOAD_UPDATE_HANDLER        RdmaOffloadUpdateHandler;
    MINIPORT_RDMA_OFFLOAD_QUERY_HANDLER         RdmaOffloadQueryHandler;
    MINIPORT_RDMA_OFFLOAD_REQUEST_COMPLETION_NOTIFICATION_HANDLER
        RdmaOffloadRequestCompletionNotificationHandler;
    MINIPORT_RDMA_OFFLOAD_SET_COMPLETION_EVENT_HANDLER_HANDLER
        RdmaOffloadSetCompletionEventHandlerHandler;
} NDIS_PROVIDER_CHIMNEY_OFFLOAD_RDMA_CHARACTERISTICS,
*PNDIS_PROVIDER_CHIMNEY_OFFLOAD_RDMA_CHARACTERISTICS;
```

(3) The miniport obtains RDMA chimney-specific completion and event handlers from NDIS by calling the NdisMGetOffloadHandlers API:

```
VOID
NdisMGetOffloadHandlers
(
    IN NDIS_HANDLE                      NdisMiniportHandle,
    IN NDIS_CHIMNEY_OFFLOAD_TYPE        ChimneyType,
    OUT PNDIS_OFFLOAD_EVENT_HANDLERS    *OffloadHandlers
);
```

For the RDMA chimney, the miniport should set ChimneyType equal to NdisRdmaChimneyOffload. The NDIS then returns the following structure which contains RDMA-specific completion and event handlers.

```
typedef struct_NDIS_RDMA_OFFLOAD_EVENT_HANDLERS
{
    NDIS_OBJECT_HEADER Header;
    //Header.Type == NdisRdmaChimneyOffload.
    NDIS_RDMA_OFFLOAD_ASYNCHRONOUS_EVENT_INDICATE_HANDLER
        NdisRDMAAsynchronousEventIndicate;
    NDIS_RDMA_OFFLOAD_UPDATE_COMPLETE_HANDLER
        NdisRdmaOffloadUpdateCompleteHandler;
    NDIS_RDMA_OFFLOAD_QUERY_COMPLETE_HANDLER
        NdisRdmaOffloadQueryCompleteHandler;
} NDIS_RDMA_OFFLOAD_EVENT_HANDLERS, *PNDIS_RDMA_OFFLOAD_EVENT_HANDLERS;
```

The RDMA Module 300 needs to be notified by the TCP offload module whenever an interface is brought up or brought down. The RDMA Module 300 also needs to be notified by the TCP offload module of all existing interfaces at the time it initializes. After being notified of the interface events, the RDMA Module 300 has an NDIS handle to that interface and can then register up-calls for the interface with NDIS. After this, the RDMA Module 300 can begin to use this interface for RDMA offload purposes.

At initiation, the RDMA offload module registers up-calls to the TCP offload module using the following dispatch table:

```
typedef struct_TL_OFFLOAD_CLIENT_DISPATCH
{
    USHORT                              Version;
    USHORT                              Length;
    USHORT                              UpperLayerProtocolId;
    //This is the protocol ID that is using the TCP offload module.
    PTL_OFFLOAD_CLIENT_ADD_INTERFACE    AddInterfaceIndicate;
    PTL_OFFLOAD_CLIENT_DELETE_INTERFACE DeleteInterfaceIndicate;
    ....
    <Other client dispatch routines that are used by offload, e.g., initiate offload complete.>
    ....
} TL_OFFLOAD_CLIENT_DISPATCH, *PTL_OFFLOAD_CLIENT_DISPATCH;
The up-call TL_OFFLOAD_CLIENT_ADD_INTERFACE is defined as follows:
typedef
VOID
(NTAPI *PTL_OFFLOAD_CLIENT_ADD_INTERFACE)
(
    IN PTL_OFFLOAD_INDICATE_INTERFACE           Args,
    IN CONST TL_OFFLOAD_INTERFACE_CHARACTERISTICS   *TLCharacteristics
);
```

The function signature of TL_OFFLOAD_CLIENT_DELETE_INTERFACE is exactly the same as that of the add interface call, except for the name.

The TCP offload module calls the above "add interface notification" up-call to the RDMA Module 300 when a new interface has been brought up in the system or when the RDMA Module 300 registers with the TCP offload module. For the later case, interface(s) may have already been brought up in the system, and the TCP offload module needs to call up-calls for each existing interface.

In order to initiate an RDMA offload process, the RDMA Module 300 calls the initiate offload function of the TCP offload module because RDMA is a dependent protocol of TCP. As such, the RDMA Module 300 needs to obtain Initiate offload handlers from the TCP module and set corresponding completion handlers to the TCP module. These two sets of handlers are exchanged through the Transport Layer Interface 302.

Following are the definition of the Initiate Offload handler provided by the TCP module to the RDMA Module 300 and its completion handler:

```
typedef
NTSTATUS
(*PTL_PROVIDER_OFFLOAD_INITIATE_OFFLOAD)
(
    HANDLE                              TCPConnectionHandle,
```

```
PNDIS_PROTOCOL_OFFLOAD_BLOCK   OffloadBlock
)
typedef
VOID
(*PTL_CLIENT_OFFLOAD_INITIATE_OFFLOAD_COMPLETE)
(
   PNDIS_PROTOCOL_OFFLOAD_BLOCK   OffloadBlock
)
```

The first one is the initiate offload handler. It initiates RDMA offload on an already established TCP connection. The second one is the completion handler. In addition to the above initiate offload handler, there are also terminate offload, update offload, and query offload handlers, and their respective completion handlers.

Offload handlers are exchanged between the TL client and provider in the following way. When a TL client is bound to a TL provider, it is provided with the following structure:

```
typedef struct _TL_PROVIDER_DISPATCH
{
   PTL_PROVIDER_IO_CONTROL                  IoControl;
   PTL_PROVIDER_QUERY_DISPATCH              QueryDispatch;
   PTL_PROVIDER_ENDPOINT                    Endpoint;
   PTL_PROVIDER_MESSAGE                     Message;
   PTL_PROVIDER_LISTEN                      Listen;
   PTL_PROVIDER_CONNECT                     Connect;
   PTL_PROVIDER_RELEASE_INDICATION_LIST     ReleaseIndicationList;
   PTL_PROVIDER_CANCEL                      Cancel;
} TL_PROVIDER_DISPATCH, *PTL_PROVIDER_DISPATCH;
```

In that structure, there is a QueryDispatch function. This QueryDispatch function is used to exchange extended dispatch routines between a TL client and a TL provider. Offload dispatch routines are considered semantically to be a part of an "extended" TLNPI interface. As such, this QueryDispatch function is called to exchange offload handlers. The QueryDispatch function is defined as follows:

```
typedef
NTSTATUS
(NTAPI *PTL_PROVIDER_QUERY_DISPATCH)
(
   IN HANDLE                         ClientHandle,
   IN PTL_REQUEST_QUERY_DISPATCH     QueryDispatchRequest
);
```

The following data structure is used to exchange the call handlers:

```
typedef struct _TL_REQUEST_QUERY_DISPATCH
{
   IN PTL_CLIENT_CREATE_REQUEST_COMPLETE   RequestComplete;
   IN PVOID                                RequestContext;
   IN PNPIID                               NpiId;
   IN CONST VOID                           *ClientDispatch;
   OUT CONST VOID                          *ProviderDispatch;
} TL_REQUEST_QUERY_DISPATCH, *PTL_REQUEST_QUERY_DISPATCH;
```

The ClientDispatch in the above structure contains offload up-call handlers. It contains at least the following handlers:

```
{
   TLOffloadAddInterfaceIndicate,
   TLOffloadDeleteInterfaceIndicate,
   TLOffloadInterfaceWillGoDownIndicate,
   TLOffloadInitiateOffloadComplete,
   TLOffloadTerminateOffloadComplete,
   TLOffloadUpdateOffloadComplete,
   TLOffloadQueryOffloadComplete
}
```

The ProviderDispatch in the above structure contains offload down-call handlers. It contains at least the following handlers:

```
{
   TLOffloadInitiateOffload,
   TLOffloadTerminateOffload,
   TLOffloadUpdateOffload,
   TLOffloadQueryOffload
}
```

To avoid a race condition that might occur during the initiation of an RDMA connection offload, the RDMA Module 300 asks the TCP layer to flush all pre-posted receive buffers. Moreover, the RDMA Module 300 ignores all receive indications from the TCP layer after a certain point in the state transition. Here is a function provided by the TLNPI layer and called by the RDMA Module 300 to flush all pre-posted receive buffers on a connection:

```
NTSTATUS
TLFlushReceiveBuffer
(
    HANDLE   EndPointHandle
)
```

If there are no pre-posted buffers, then the TCP module does nothing, just returning STATUS_SUCCESS. If there are any pre-posted buffers (pre-posted receive requests), they are completed with whatever bytes that have been received so far. (Most likely, they will complete with zero bytes). If the TCP connection has already been offloaded to the RNIC, and if there are any pre-posted buffers on the hardware, because there is no mechanism for the hardware to flush pre-posted receive buffers, the TCP layer will upload the connection to the software stack first and then flush the receive buffers.

Specifics of an Exemplary RDMA Architecture

Offload

This section is illustrated with a series of workflow diagrams that represent offload procedures. In the calls in these diagrams, a "W" refers to "WSK", an "R" refers to the RDMA Module 300, and an "M" refers to the RNIC miniport. So, for example, "WR" represents a call between the WSK module and the RDMA Module 300.

For APIs provided by the different modules, the naming convention is:
  WskRdmaXXX: The WSK RDMA extension APIs provided by the WSK to the user.
  TL_XXX (or TLXXX): The APIs provided by the TCP layer and called by the RDMA Module 300.
  MINIPORT_RDMA_OFFLOAD_XXXX: RNIC miniport dispatch routines. They are provided by the miniport and called by NDIS.

The API function signatures in this document are presented for illustrative purposes only and are subject to change during implementation.

For the WSK layer, a socket can have the following states: StreamingMode, RdmaTransitionInProgress, or RDMA-Mode. For the RDMA Module 300 layer, a connection can have the states: NotReadyToOffload, ResourceReservationInProgress, ReadyToOffload, WaitForFirstRecvBuffer, OffloadInProgress, or Offloaded.

Figure 4:
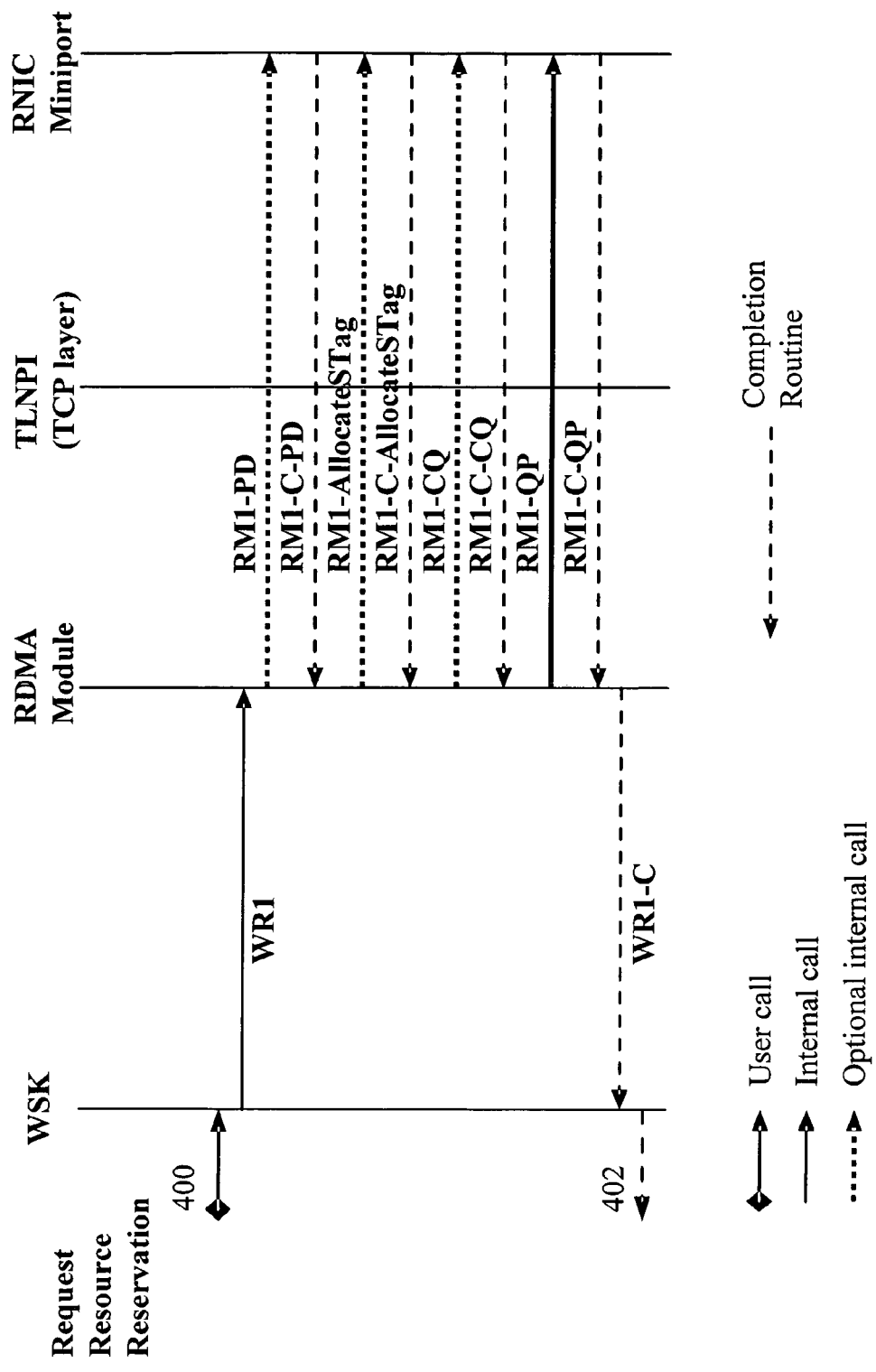
FIG. 4 is a workflow diagram of a method for reserving RDMA resources.

FIG. 4 depicts a call sequence for reserving RDMA chimney resources. It is initiated by the WSK asynchronous Ioctl call SIO_RDMA_RESERVE_RESOURCE at 400. Either the WSK module or the RAL Proxy Module can make this call. This is the first call made by consumers of the RDMA Module 300. If optional parameters are not passed in, the default values passed to the RNIC 308 are: IRD and ORD (Inbound RDMA Read Requests and Outbound RDMA Read Requests) of this RDMA QP are determined by the RDMA Module 300 at runtime to accommodate the current system load; EnableRDMARead and EnableRDMAWrite default to TRUE; and LengthOfSQ and LengthOfRQ are determined by the RDMA Module 300 at runtime to accommodate the current system load. This API is called and completed with STATUS_SUCCESS at 402 before the user can call any other APIs of the RDMA Module 300. It returns the actual resources allocated, which may be different from the resources requested. All interactions occur in kernel mode.

402 is the completion routine of call 400. If it returns STATUS_SUCCESS, that means the RDMA layer has successfully allocated the required resources for the QP, and this RDMA chimney is ready to be offloaded. It also returns the actual properties allocated for this connection. If it returns any error code, it means that the allocation has failed.

The WR1 call forwards the SIO_RDMA_RESERV_RESOURCE Ioctl request from WSK to the RDMA Module 300. This call essentially starts the state machine in the RDMA Module 300. The RDMA Module 300 maintains a separate state machine for each connection. The successful completion of this call places the connection in the ReadyToOffload state. While this call is pending, the state of the connection is ResourceReservationInProgress. This API is provided by the RDMA Module 300 to the WSK Module:

```
NSTATUS
RDMAOffloadAllocateOffloadResoruce
(
    IN HANDLE    TCPConnectionHandle,
    IN ULONG     IRD                    OPTIONAL,
    IN ULONG     ORD                    OPTIONAL,
    IN BOOL      EnableRDMARead         OPTIONAL,
    IN BOOL      EnableRDMAWrite        OPTIONAL,
    IN ULONG     LengthOfSQ             OPTIONAL,
    IN ULONG     LengthOfRQ             OPTIONAL,
    IN HANDLE    RelatedConnection      OPTIONAL,
    IN HANDLE    CompletionRoutine,
    IN HANDLE    RequestContext
)
```

WR1-C is the completion routine of WR1, and it indicates the result of that call. If the return result is STATUS_SUCCESS, then the actual values of the QP properties are also returned.

```
typedef
VOID
(*RDMA_OFFLOAD_ALLOCATE_OFFLOAD_RESOURCE_COMPLETE)
(
    IN HANDLE     RequestContext,
    IN ULONG      ActualIRD,
    IN ULONG      ActualORD,
    IN ULONG      ActualLengthOfSQ,
    IN ULONG      ActualLengthOfRQ,
    IN NTSTATUS   CompletionStatus,
    IN ULONG      CompletionReasonCode
)
```

RM1 is potentially a series of calls made by the RDMA Module 300 to the RNIC miniport to create a QP. To create the QP, the miniport needs to be provided with a Protection Domain ID and a Completion Queue handle. Multiple QPs can share one PD and one CQ. The RDMA Module 300 decides whether the QP to be created will share PDs or CQs with other QPs based on its PD/CQ sharing policy. For the WSK interface, by default a PD is unique on a per connection basis, but the consumer has the option to put different connections into one PD. A CQ is shared among a limited number of QPs. For the RAL Proxy interface, there are no defaults: The RDMA Module 300 exposes essentially all of the parameters that can be set for the creation of a PD, CQ, and QP directly to the RAL Proxy. If the RDMA Module 300 decides that a new PD/CQ should be created for this QP, then the following dispatch routines are called.

RM1-PD is an asynchronous call to create a PD. Upon successful completion, the Protection Domain ID (PDID) is created. In terms of the NDIS API, this call is embedded into the "Update Offload" call with "create PD" as its op-code.

RM1-AllocateSTag allocates a set of STags for Fast-Register.

RM1-CQ creates a CQ or modifies a previously created CQ. The call to create a CQ is asynchronous and specifies the length of the CQ. That length is the sum of the lengths of the RQs and SQs (send queues) that share this CQ. The length of a CQ can change when more SQs and RQs are associated with this CQ. In terms of the NDIS API, the create CQ call is embedded into the "Update Offload" call with "Create CQ" as its op-code. After the CQ has been successfully created, completion notification is requested on the new CQ. It is required by the RDMA verb spec that a consumer of a QP request completion notification for a CQ if notification has been requested when a CQE (completion queue event) is queued. Otherwise, the completion event handler is not called if anything is queued into this CQ.

The following apply when RM1-CQ is called to modify an existing CQ. (1) If the RDMA Module 300 decides that this QP can share a CQ with other QPs, then it retrieves the handle of an existing CQ that is to be shared from its internal table. However, the existing CQ may not be large enough to accommodate the new QP so it may need to be resized by the Modify CQ verb. (2) Modify CQ is called after the RM1-QP (create QP) call. The RDMA Module 300 first tries to create a QP of the desired size, and, if the creation of the QP is successful, then it tries to modify the existing CQ that will be shared by the newly created QP. (3) If the CQ cannot be grown to accommodate the additional QP, then a new CQ is created. (4) In terms of the NDIS API, this call is embedded into the "Update Offload" call with "Modify CQ" as its op-code. (5) The re-sizing operation on a CQ is expensive and may affect the operation of the QPs that are associated with the CQ being resized. The RDMA Module 300 tries to re-size the CQ as few times as possible and associates only a reasonable number of QPs with a CQ.

RM1-QP creates a QP. After the PD ID and CQ handle have been created, the RDMA Module 300 layer calls the Create QP verb to create a QP for this connection. This call is made before the RM1-CQ call if the RM1-CQ call is to modify an existing CQ. In other words, a QP is created first, and then the CQ is modified to accommodate that new QP. In terms of the NDIS API, this call is embedded into the "Update Offload" call with "Create QP" as its op-code.

RM1-C-QP, RM1-C-PD, and RM1-C-CQ are the completion handlers corresponding to the above original calls.

When the completion handler of Create QP is called, the RNIC state for this connection has been allocated. The PD, CQ, and QP are initialized. (The QP is in the IDLE state.) The RDMA Module 300 calls WR1-C with the corresponding status and reason code. The completion chain eventually pops up to the WSK or RAL Proxy consumer, and this finishes the Ioctl call to reserve RDMA offload resources. At the successful completion of this process, the RDMA Module 300 sets the connection state to ReadyToOffload.

After RDMA resources have been successfully allocated, the consumer may wish to exchange additional configuration information before transitioning into RDMA mode. The only parameter that can be changed through the WSK interface is the amount of RDMA read resources (IRD and ORD). This call can be made while the connection is in streaming mode or RDMA mode. If there are outstanding calls to WskRdmaGet( ), the RDMA Module 300 completes the call with an error. If there are no outstanding WskRdmaGet( ) calls, then the ORD value may be changed. The IRD value should only be changed if there will be no RDMA Read Requests arriving on the link. If there are, changing IRD could cause the connection to be torn down. For some applications, this value will be changed before any RDMA Reads can be generated. For other applications, an application-specific negotiation is done to flush RDMA Read Requests before the change is made. Note that both the IRD and ORD are specified. If no change is desired, then the values from the last call which set the IRD or ORD resource should be used.

Figure 5:
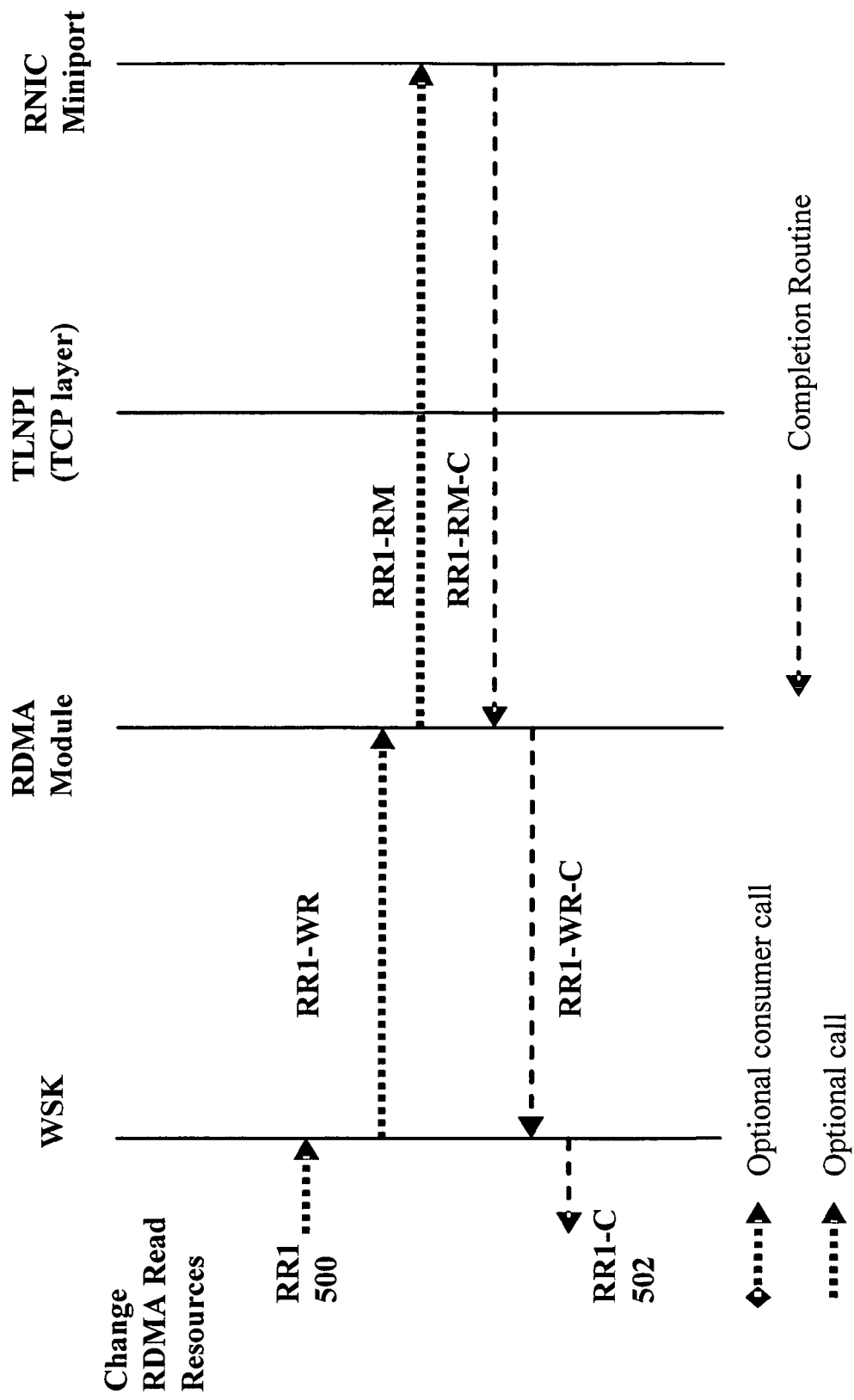
FIG. 5 is a workflow diagram of a method for changing RDMA read resources.

In FIG. 5, a request 500 is made to change RDMA read resources. RR1-WR simply passes the request structure through to the RDMA Module 300. The RDMA Module 300 then issues a Modify QP (RR1-RM) to change the RDMA Read Resources, if there are no outstanding RDMA Read Requests. Note that it is expected that changing IRD while the QP is still in the IDLE state will always succeed.

Figure 6:
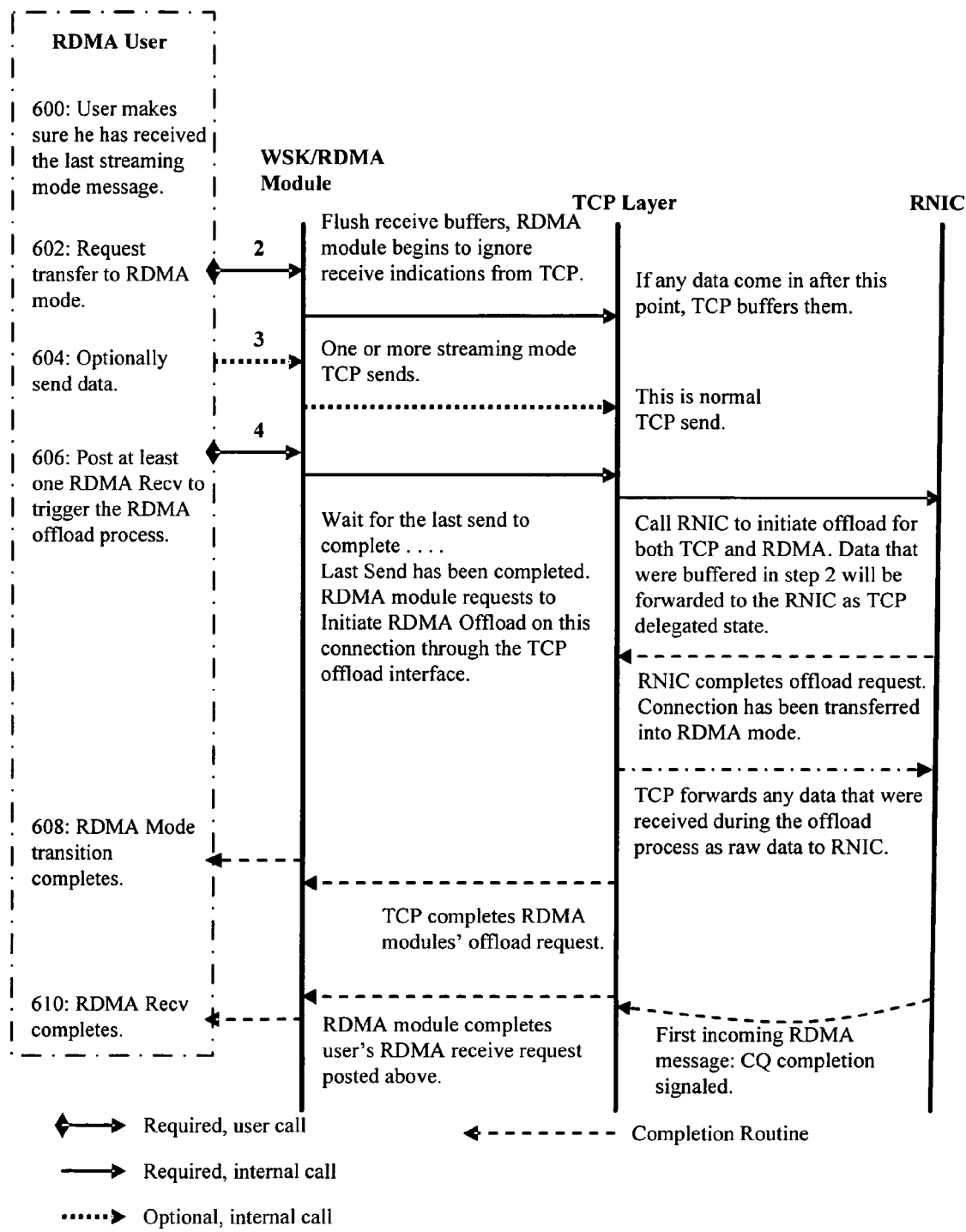
FIG. 6 is a workflow diagram of a method for transitioning a packet stream to RDMA mode.

FIG. 6 illustrates the transition to RDMA Mode. Before step 600, the consumer knows that the RDMA chimney resources on the current connection have been allocated but are not enabled. The following requirements are placed on the consumer:

The consumer ensures that the request to transfer to RDMA mode (602) is only made after the last streaming mode message from the remote peer is received. This clearly defines the transition between TCP mode and RDMA mode on the incoming half of the TCP stream. The consumer makes sure of this by his own protocols with the remote peer. All incoming traffic after the last streaming mode message is expected to be in iWARP mode.

The consumer cannot post any more traditional socket WskRecv calls after this call. An in-line error is returned for such an attempt. All outstanding WskRecv calls that have been posted before this call 602 but have not yet been completed are completed with zero bytes.

The consumer may post one or more WskSend calls after this call 602 and before the first WskRdmaRecv call 606. The last WskSend call posted by the consumer during this period is the last outgoing streaming mode message.

The consumer is required to post the first WskRdmaRecv call 606, otherwise, the RDMA offload process never begins.

WSK sets the state of this connection to "RdmaTransitionInProgress" and keeps the connection in this state until it receives a successful completion of the offload (608). When 608 is called, the connection has been switched into RDMA mode. WSK moves the state of this connection to "RDMAMode."

Immediately after WSK moves to the "RdmaTransitionInProgress" state, it flushes the receive buffers and begins to ignore any receive indications from the TCP layer. It returns STATUS_DATA_NOT_ACCEPTED for all receive indication up-calls from the TCP layer. By doing so, it effectively asks the TCP layer to process all incoming data and then buffer them. Later, the buffered data are forwarded to the RNIC 308. This is required to avoid a race condition that could happen during RDMA offload initiation. Moreover, immediately after WSK moves to the "RdmaTransitionInProgress" state, all of its pre-posted receive requests (if any) to the TCP layer are completed with a certain number of bytes (most likely with zero bytes).

At 2, the following API is used by the WSK to signal the transition to RDMA mode. This API requests that the TCP stack flush all pre-posted receive buffers. (TLNPI should expose an API for this purpose). Moreover, this API sets the state of this connection in the RDMA Module 300 to "WaitForFirstRecvBuffer" state, which is the last state before the offload actually starts. Note that the TCP state may be in the host stack or it may have been offloaded already.

```
NTSTATUS
RDMAOffloadStartOffload
(
    IN HANDLE    TCPConnectionHandle,
    IN HANDLE    CompletionRoutine,
    IN HANDLE    RequestContext
)
```

The following call is made by the RDMA Module 300 layer to the TCP layer. It asks the TCP layer to flush all pre-posted receive buffers. This call is specified by the TLNPI interface.

```
NTSTATUS
TLFlushReceiveBuffer
(
    IN HANDLE       EndPointHandle
)
```

At 604, the consumer may perform one or more normal TCP sends on the outgoing half of the TCP stream. This feature may be used by some ULPs to set up the RDMA connection. If a ULP requires that a last streaming mode message be sent to the remote peer to trigger the remote peer to switch to RDMA mode, then that last streaming mode message is sent in this step, that is, after call 2 and before step 606. After the consumer has sent his last streaming mode message to the remote peer, the consumer posts the first RDMA receive request 606 to trigger the real transition process and to notify the RDMA module 300 that the last streaming mode message has been sent. After step 606, the consumer cannot send any more streaming mode messages.

A consumer is not required to wait for the completion of call 3 (WskSend) before making call 4 (WskRdmaRecv). As such, it is possible that the consumer may make call 4 to trigger the offload process before the TCP layer completes sending the last streaming message. In other words, call 4 may be made by the consumer before the TCP ACK for the last streaming message is received, or even before the TCP layer sends out the last streaming message. If this happens, the RDMA Module 300 waits for the completion of call 3 before it actually starts executing call 4 for the consumer. This helps solve many race conditions that would have happened if un-completed outgoing streaming mode messages were handed down to the RNIC 308 as part of the RDMA offload state. This means that the RNIC 308 need not have dual modes to support both Streaming mode and RDMA Mode traffic at the same time. This also frees the RNIC 308 from the complications of re-transmitting the last streaming mode message when the hardware is in RDMA mode. From the RNIC 308's point of view, there will be no last streaming mode message to send: The message should have already been sent (and TCP ACK received) by the software stack before the offload initiates. This also implies that no outgoing streaming mode messages are forwarded down to the RNIC 308 at or after RDMA offload initiation.

At step 606, the consumer makes a WskRdmaRecv call, and the actual RDMA offload process begins. The consumer should be able to estimate the size of the first incoming RDMA message based on his application and protocol needs. This call is designed to avoid a potential race condition when entering RDMA mode. If the consumer were not required to pre-post a buffer before entering RDMA mode, it is possible for the remote peer to send an RDMAP Send Type Message before the consumer has time to post a receive buffer (after the transition to RDMA mode completes). If this occurs, the connection would be torn down. Thus the API requires that the consumer pre-post at least one buffer. After WSK gets this call at 4, it forwards the request to the RDMA Module 300 through call WR4 (not shown in FIG. 6).

WR4 is an API provided by the RDMA Module 300 to let users pass in a receive buffer after requesting the transfer to RDMA mode. WR4 posts an RDMA receive buffer to the RDMA Module 300 layer and starts the offload process by calling TCP offload functions. The WR4 API is specified as follows:

```
NSTATUS
RDMAOffloadPostFirstReceiveBuffer
(
    IN HANDLE                    TCPConnectionHandle,
    IN PWSK_BUFLIST              LocalReceiveBufferList,
    IN PWSK_RDMA_LOCAL_BUFSGL    LocalBufferSGL,
    IN HANDLE                    CompletionRoutine,
    IN HANDLE                    RequestContext
)
```

The user of this API must pass in only one of LocalReceiveBufferList and LocalBufferSGL.

The WR4 call is implemented in the RDMA Module 300 as follows:

The RDMA Module 300 first looks at its internal state machine for this connection to see if it is in the "WaitForFirst1RecvBuffer" state. If not, then it immediately returns an error code. Moreover, if a Streaming mode send is pending, then the RDMA Module 300 waits for it to complete before continuing with the following steps.

The RDMA Module 300 sets its state machine for this connection to "OffloadInProgress." It also prepares the RDMA_OFFLOAD_STATE data structure. There is a QP handle in this data structure. The QP was created by the consumer during the resource reservation stage for this connection.

If PWSK_BUFLIST is not NULL, then the RDMA Module 300 converts the PWSK_BUFLIST into a list of scatter/gather elements: (1) The RDMA Module 300 registers the buffers in the buffer list with the RNIC 308 to get back a list of local STags. (2) The RDMA Module 300 makes an SGL using the STags obtained by the above step. (3) The local STags registered by the RDMA Module 300 for the user are invalidated by the RDMA Module 300 at the time the receive request is completed. (4) The parameter PWSK_RDMA_LOCAL_BUFSGL must be NULL. If not, then the RDMA Module 300 uses this SGL directly. The local STags provided by the user are invalidated by the RDMA Module 300. That is, if this parameter is not NULL, then the RDMA Module 300 does not invalidate the STags contained in that SGL when the receive request is completed.

The RDMA Module 300 calls PostRQ to post the buffer to the RQ.

The RDMA Module 300 prepares the NDIS_PROTOCOL_OFFLOAD_BLOCK and hooks the RDMA_OFFLOAD_STATE into that data structure.

The RDMA Module 300 makes the call RT4c (see below) which initiates the TCP offload. There are two cases here: (1) If the TCP connection has not been offloaded before, then the TCP layer does not have the offload handle. It starts a new offload process and builds an NDIS_PROTOCOL_OFFLOAD_BLOCK TCP offload data structure in which the RDMA offload block is pointed to as a dependant block. (2) If the TCP connection has already been offloaded, then the TCP layer does have the offload handle, and it simply chains the RDMA block to the end of that list and passes it to the RNIC 308.

RT4c is the initiate offload call provided by the TCP layer. The RDMA Module 300 passes in an NDIS_PROTOCOL_OFFLOAD_BLOCK which has RDMA_OFFLOAD_STATE.

```
typedef
NTSTATUS
(*PTL_PROVIDER_EXTENSION_INITIATE_OFFLOAD)
```

-continued

```
(
    HANDLE                         TCPConnection-
                                   Handle,
    PNDIS_PROTOCOL_OFFLOAD_BLOCK   OffloadBlock
)
```

The RDMA_OFFLOAD_STATE block is defined as follows:

```
typedef struct _RDMA_OFFLOAD_STATE
{
    IN ULONG      OpCode;
    OUT ULONG     RDMAReasonCode;
    union
    {
      struct
      {
        HANDLE    QPHandle;
      }StatesToInitiateOffload
      struct
      {
        PVOID     InputBuffer;
        ULONG     InputBufferLength;
        PVOID     OutputBuffer;
        ULONG     OutputBufferLength;
      }StatesToBeUpdatedOrQueried;
    }StateCategory;
}RDMA_OFFLOAD_STATE, *PRDMA_OFFLOAD_STATE;
```

The field that is related to this discussion is the QPHandle, which is the QP this connection will be using. The above structure is hooked into the NDIS_MINIPORT_OFFLOAD_BLOCK.

A set of calls is made by the TCP chimney to start its offload process. This goes all the way down to the RNIC 308 with a linked list of offload state blocks. In that linked list, the RDMA protocol offload block is a dependant block of the TCP protocol offload block. As such, the miniport knows that this TCP connection is also going to be offloaded as an RDMA connection. The QP handle is contained in the RDMA_OFFLOAD_STATE block, and it will be the QP used for this connection. A completion routine is called by the RNIC miniport to the TCP chimney to indicate that the offload has been completed. It indicates that both the TCP and the RDMA offload have been completed.

The TCP layer signals completion to the RDMA Module 300. This is the completion routine corresponding to call RT4c. At this point, the RDMA Module 300 is notified that the RDMA offload has been completed, and it takes two actions immediately: (1) It signals a completion for call 2 which is the first call made by the user to initiate the RDMA offload process. This completion is not signaled for WR4, because that is a Receive call which posts a receive buffer, and it should not be completed until the receive buffer is filled. The WR4 call will be completed by WR4-C later. (2) The RDMA Module 300 sets its internal state machine for this connection to the Offloaded state. The prototype of this completion call is:

```
typedef
VOID
(*PTL_CLIENT_EXTENSION_INITIATE_OFFLOAD_COMPLETE)
(
    PNDIS_PROTOCOL_OFFLOAD_BLOCK   OffloadBlock
)
```

Upon receiving a completion indication corresponding to the start offload call, the WSK layer sets the state of this connection to RDMAMode. The completion routine is called by the RDMA Module 300 layer and is defined as follows:

```
typedef
VOID
(*RDMA_OFFLOAD_START_OFFLOAD_COMPLETE)
(
    IN HANDLE     RequestContext,
    IN NTSTATUS   CompletionStatus,
    IN ULONG      CompletionReasonCode
)
```

The completion routine corresponding to call 2, the WSK Ioctl call that sets the socket into RDMA mode, is called by the WSK layer to the user of WSK. Upon receiving a successful completion at this point, the user of WSK can be sure that the RDMA connection has been offloaded and that new RDMA requests can be posted on this connection. The WSK sets the state of this socket to "RDMAMode."

WR4-C is the completion routine for the WR4 call. It is called by the RDMA Module 300 after it receives a CQ completion indication from the RNIC 308. The CQE retrieved from the CQ indicates that the receive buffer posted at the beginning of the offload by WR4 has been filled. The receive completion routine is defined as follows:

```
typedef
VOID
(*RDMA_OFFLOAD_RECEIVE_COMPLETE)
(
    IN HANDLE     RequestContext,
    IN ULONG      BytesReceived,
    IN NTSTATUS   CompletionStatus,
    IN ULONG      CompletionReasonCode
)
```

The completion routine for call 4 indicates that the receive buffers posted have been filled with RDMA data.

To summarize the WSK states, WSK is in StreamingMode before the consumer makes call 2, is in RdmaTransitionInProgress immediately after call 2 and before call 2 completes, and is in RDMAMode immediately after call 2 completes. While the WSK is in StreamingMode, the consumer can call:

all WSK Normal APIs (WskSend, WskRecv, etc),

SIO_RDMA_RESERVE_RESOURCE, SIO_RDMA_READ_RESOURCES,

SIO_RDMA_SWITCH_TO_RDMA_MODE, WskRdmaAllocateSTag,

WskRdmaDeallocateSTag, and WskRdmaMapBuffer but cannot call:

WskRdmaMapAndSend, WskRdmaRecv, WskRdmaPut, or WskRdmaGet.

While the WSK is in RdmaTransitionInProgress, the consumer can call:

WskSend (allowed before WskRdmaRecv is called), WskRdmaRecv,

WskRdmaAllocateSTag, WskRdmaDeallocateSTag, WskRdmaMapBuffer, and

SIO_RDMA_READ_RESOURCES but cannot call:

all other WSK APIs, SIO_RDMA_RESERVE_RESOURCE,

SIO_RDMA_SWITCH_TO_RDMA_MODE, WskRdmaPut, WskRdmaGet,

WskRdmaMapAndSend, or

WskSend (not allowed after WskRdmaRecv is called).

When the WSK is in RDMAMode, the consumer may call:
   SIO_RDMA_READ_RESOURCES, WskRdmaMapAndSend, WskRdmaRecv,
   WskRdmaPut, WskRdmaGet, WskRdmaAllocateSTag, WskRdmaDeallocateSTag,
   WskRdmaMapBuffer, and WskDisconn but cannot call:
   any of the WSK Normal APIs, except for WskDisconn,
   SIO_RDMA_RESERVE_RESOURCE, or
   SIO_RDMA_SWITCH_TO_RDMA_MODE.

After the RNIC 308 has transferred the TCP stream into RDMA mode, incoming data may have been buffered by the TCP layer. As discussed above, no outgoing streaming mode data are forwarded to the RNIC 308 during RDMA chimney offload. The RNIC 308 does not need to send the last streaming mode message: The message should have already been sent (and a TCP ACK received) by the software stack before the offload initiates. However, the RNIC 308 does need to process incoming RDMA mode data that are received before and during the RDMA offload process. Those data are either handed down to the RNIC as part of the TCP offload delegated state or forwarded to the RNIC through the TCP forwarding interface.

There is a potential race condition in which a remote peer may begin to send RDMA mode data even before the local peer initiates offload. In this case, the TCP software stack accepts all incoming data, does normal TCP protocol processing on these data, and buffers the TCP payload in its buffer. The "TCP payload" is actually RDMA protocol data including MPA marker, DDP header, RDMA header, etc. Data that are received at this stage are handed down to the RNIC as part of the TCP delegated state with the initiate offload call. The RNIC 308 processes these data as pure RDMA data. They have already been "TCP-processed" by the software stack (TCP CRC checked, TCP ACK sent, etc.).

RDMA data may also come in during the offload process, i.e., RDMA mode data may come in after the RDMA module 300 requests Initiate offload to the RNIC 308 and before the RNIC 308 completes the offload request. In this case, the TCP software stack accepts all incoming data and buffers them as raw data. No TCP protocol processing is performed on these data. As soon as offload completion is signaled by the RNIC 308, the TCP layer forwards all incoming raw data that are buffered during this stage to the RNIC 308 through the TCP forwarding interface. The RNIC 308 first "TCP-processes" these forwarded raw data and then processes the TCP payload as RDMA data.

For resource allocation, there are two types of error: recoverable errors and non-recoverable errors. Recoverable errors are caused when the user's resource demands exceed the RNIC 308's capacity, e.g., Create QP fails because the requested IRD/ORD is too large, or Modify CQ fails because the new CQ size cannot be supported. The RDMA Module 300 returns a reason code to indicate to the user what has gone wrong. The user can then decide to re-request resource reservation or just abort. Non-recoverable errors include those caused by an RNIC 308 failure or a lost connection. Those errors return their own error codes, and the user can abort the offload attempt and return an error message to the remote peer if possible. Non-recoverable errors include: NIC is not an RNIC, failure to create a new PD, and failure to create QP even with the minimum input values. During the offload process, if the RDMA offload fails, then the connection is torn down instead of being switched back into TCP streaming mode.

For an RDMA chimney offload, a "gang offload" uses the same algorithm and design as that of the TCP chimney, but there are some additional steps to take care of:

The request to reserve RNIC resources is made and completed for each individual connection before gang offload is initiated.
   Only those connections that have successfully reserved RNIC resources should be included in the gang offload block list.
   The transition from streaming mode to RDMA mode happens individually and separately for each connection.
   The RDMA Module 300 releases any resources reserved for connections that failed to be offloaded.

Specifics of an Exemplary RDMA Architecture

State Variables

At the end of the resource reservation stage, the following RDMA states are established on the RNIC 308:

QP: A queue pair is associated with a TCP Connection Handle.
   CQ, PD: If the QP does not share CQ/PD with other QPs, or if this is a newly created QP, then the RNIC 308 also creates the CQ and PD for this QP.
   IRD, ORD: These specify RDMA read capabilities of the QP.
   Enable RDMA Read/Write: These specify whether the QP allows RDMA read/write.
   LengthOfSQ, LengthOfRQ: These are the length properties of the QP.

At the beginning of the offload, the following state is passed in as the RDMA_OFFLOAD_STATE block to the chimney driver:

QP Handle: The Queue Pair which the RDMA connection will use.

After the RDMA Module 300 successfully offloads the connection, the QP has the following states: Idle, RTS, Closing, Terminate, and Error. These states are handled by the RDMA Module 300, and they are not seen by the user. The user is notified of termination, error, and closing events by the RDMA Module 300 through event handlers.

STags are required for RDMA data transfer operations. STags can have invalid and valid states after they are created. The consumer needs to keep track of the states of local STags that have been advertised for remote access and invalidate them as necessary. The consumer also needs to keep track of any remote STags that are received from the remote peer and invalidate them as necessary. For local STags that are used for local access only, the user may choose to keep track of them if he wants to re-use the buffers. Otherwise, the RDMA Module 300 transparently handles this type of STags.

Specifics of an Exemplary RDMA Architecture

Completion and Asynchronous Event Handling

The RDMA Module 300 sets completion event handlers to the miniport through the Set Completion Event Handler verb. An RNIC 308 may support more than one completion event handler. Each time a new completion event handler is set, the RNIC miniport returns an identifier to the consumer. The identifier is used when the consumer creates a new CQ and associates that CQ with the completion event handler. This is the definition of the completion event handler:

```
typedef
VOID
(*RDMA_OFFLOAD_COMPLETION_EVENT_HANDLER)
(
   IN NDIS_HANDLE   NdisMiniportHandle,
   IN PVOID         CQHandle
);
```

The miniport calls the above handler when there is a CQE queued into a CQ and the completion notification has been requested for the CQ. The completion event handler is given the CQ Handle as an input. The RDMA Module 300 implements the completion event handler as follows:

Poll the CQ and de-queue the CQEs from the CQ one by one until there are no CQEs left.

For each CQE reaped from the CQ, process it:
(1) There is a Work Request (WR) ID in the CQE. This ID is a 64-bit pointer to the context of the WR.
(2) The context of the WR is an internal data structure of the RDMA Module 300. It was filled with relevant information of this WR when the RDMA Module 300 created this WR.
(3) In the context of the WR, there is a pointer to the original requestor of this WR (typically a WSK call).
(4) The completion routine of the original requestor may be called if all WRs issued by that original requester are completed. Otherwise, some internal states of the RDMA Module 300 are set for accumulated completions.

Immediately before this completion event handler returns, it requests completion notification again on this CQ.

When the RDMA Module 300 creates WRs to post to the SQ, it sets the Completion Notification Type of most of the WRs as "signaled completion." However, to avoid completion processing overhead, the RDMA Module 300 sets some of the WRs as "unsignaled completion." Those WRs that are set as unsignaled completion have their completion status indirectly notified by immediately subsequent WRs. The following WRs are set as unsignaled completion if they are immediately followed by other WRs: PostSQ Fast Register and PostSQ Invalidate Local STag.

Similar to the handling of Work Request Completions, there is only one Asynchronous Event handler for an RNIC 308. That asynchronous event handler is called by the RNIC 308 when there is an affiliated asynchronous event. The RDMA Module 300 registers an asynchronous event handler to the miniport at the time the NDIS exchanges call handlers with the miniport. This is the definition of the asynchronous event handler:

```
typedef
VOID
(*NDIS_RDMA_OFFLOAD_ASYNCHRONOUS_EVENT_
HANDLER)
(
    IN NDIS_HANDLE      NdisMiniportHandle,
    IN UCHAR            EventSource,
    IN PVOID            EventSourceHandle,
    IN ULONG            EventIdentifier
);
```

Most asynchronous events are signaled when the RNIC 308 encounters remote or local errors, and the RDMA connection is going to be closed. The RDMA Module 300 processes the event, logs the error, and initiates the connection tear-down and resource clean-up processes with the RNIC 308. The RDMA Module 300 eventually makes the Connection terminate up call back to its user signifying that the connection has been torn down.

Specifics of an Exemplary RDMA Architecture

Parallelizing CQ Completion Event Handling on Multiple Processors

Figure 7:
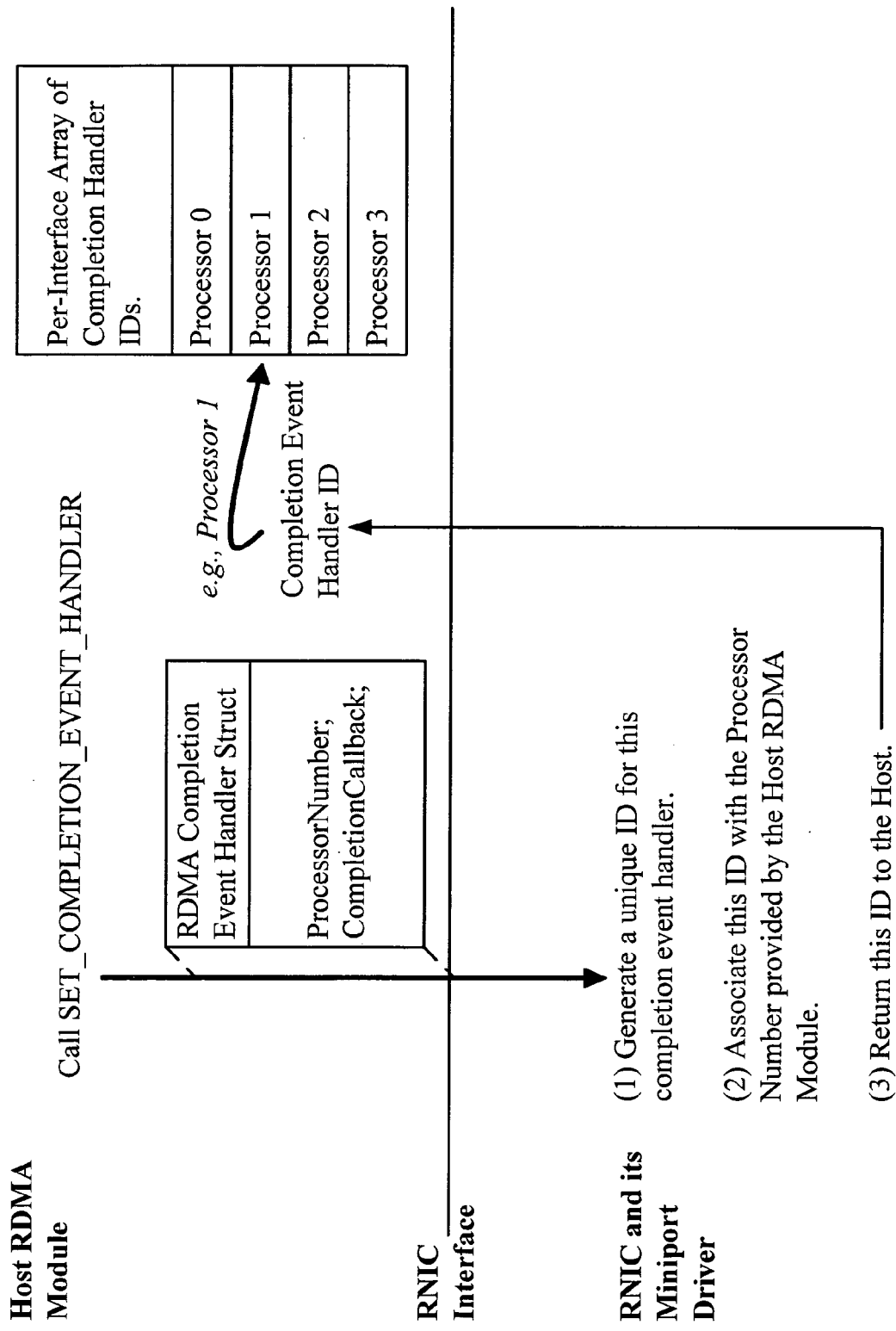
FIG. 7 is a workflow diagram of a method for initializing per-interface completion handlers on a multi-processor computing device.
Figure 9:
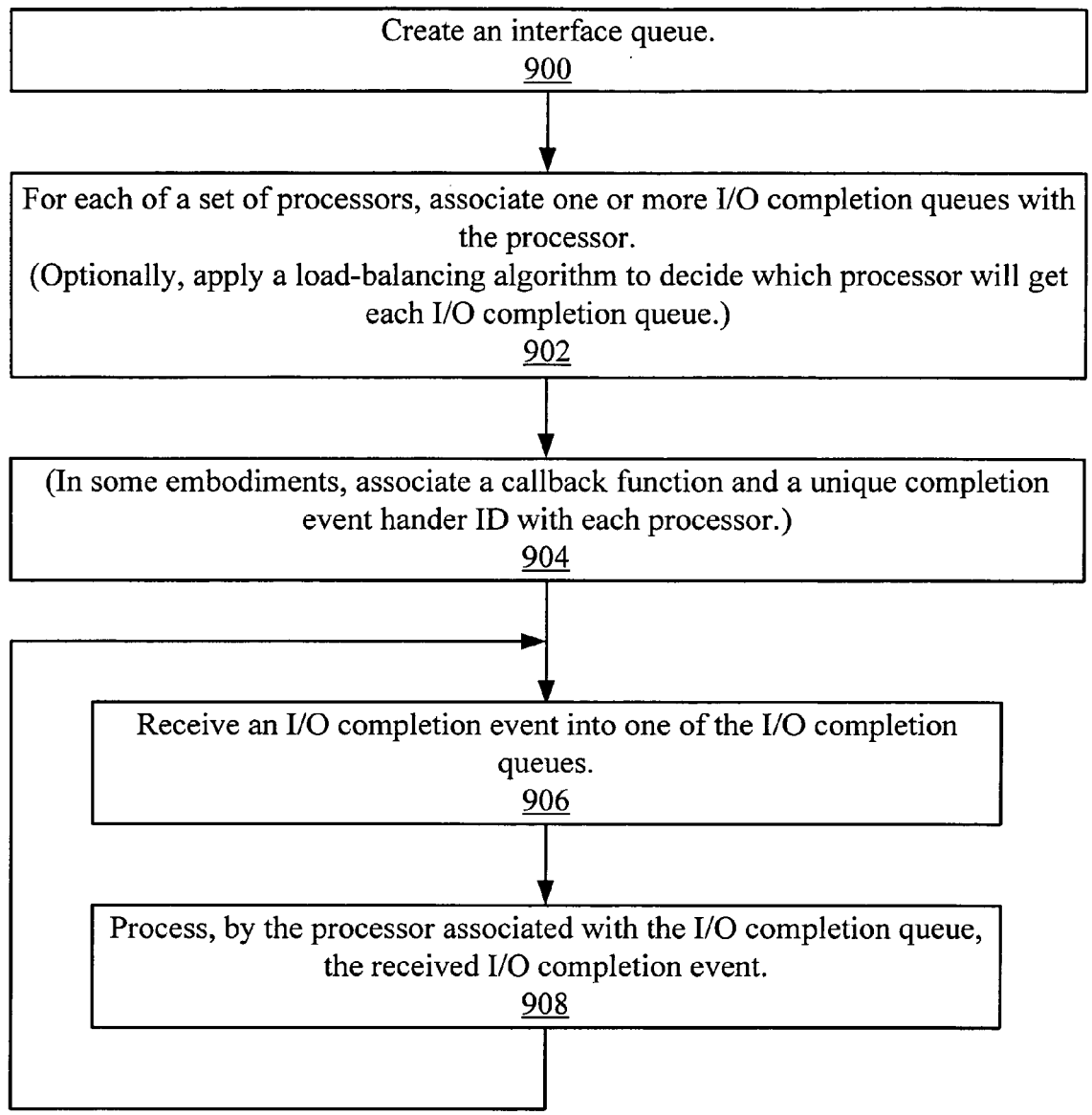
FIG. 9 is a flowchart of a method for distributing completion events among processors on a multi-processor computing device.

When an RDMA CQE is indicated from the RNIC 308 to the host stack, the host stack usually polls the CQ, takes out all CQEs of the CQ, and processes them one by one. Traditionally, even on a multi-processor computing device, only one processor performs this work while the rest of the processors are idle. FIGS. 7 through 9 and the following text describe how multiple processors can be used in parallel to speed up CQE processing. This method is applicable to any RNIC 308 that supports multiple CQE handlers.

In step 900 of FIG. 9, when an RNIC 308 is indicated as up to the RDMA module 300, the RDMA module 300 sets up a per-interface data structure to track the interface. That per-interface data structure contains an array of descriptors. Each descriptor corresponds to one processor and stores a completion event handler ID for that processor (step 904). Later, if there are CQs to be created on that processor, this completion event handler ID is used for them.

The array is initialized at interface up time. The RDMA module 300 uses the SET_COMPLETION_EVENT_HANDLER verb to set completion event handlers to the RNIC 308. The RDMA module 300 calls this verb N times where N equals the number of processors in the system (or the subset of the total number of processors that will be involved in CQE processing). As shown in FIG. 7, for each call the RDMA module 300 provides the RNIC 308 with a data structure containing a processor number and a completion callback function. This associates each completion event handler with one processor. For each invocation of the SET_COMPLETION_EVENT_HANDLER verb, the RNIC 308 returns a unique completion event handler ID. Thus, a one-to-one mapping is established between completion event handler IDs and processors. FIG. 7 illustrates the process of initializing the per-interface completion event handler ID array using the augmented SET_COMPLETION_EVENT_HANDLER call.

When a new RDMA connection is to be established, the RDMA module 300 decides whether a new CQ should be created for that RDMA connection. If a new CQ is created, then the RDMA module 300 runs a load-balancing algorithm and other heuristics to determine on which processor to create the CQ (step 902 of FIG. 9). Once a decision is made to create a new CQ on a processor, for example on processor K, the RDMA module 300 uses K as an index into its per-interface array of completion event handler IDs and retrieves the completion event handler ID of processor K. That ID is used as an input to create this new CQ. Doing so effectively tells the RNIC 308 that this new CQ is bound to processor K. The result of this step is, for each processor, a two-level tree of CQs and QPs rooted from the processor. For a multi-processor computing device, this becomes a forest of trees as illustrated in FIG. 8.

When a CQE is queued into a CQ and a decision is made to indicate the CQE to the host OS (step 906 of FIG. 9), the RNIC miniport driver schedules a DPC to run on the processor that is associated with the CQ. The RDMA Module 300 polls the CQ and processes each CQE polled in the context of the DPC routine (step 908). Because multiple DPC routines can run on multiple processors simultaneously, this achieves the goal of parallel CQE processing.

Specifics of an Exemplary RDMA Architecture

Closing a Connection and Error Handling

Closing an RDMA connection can be a very complex and error-prone process if not handled carefully. Complexity mainly comes from two aspects: (1) interactions between the host OS and the RNIC 308 hardware and (2) interactions between the RDMA Module 300 and the TCP layer of the host OS.

The following rules and processes define the interactions between the RNIC 308 (and its miniport driver) and the host OS for successfully handling RDMA connection closure. These general rules are illustrated below in the context of specific closure scenarios.

The RNIC miniport is never directly called with "Modify QP(RTS→Closing)" or with "Modify QP(RTS→Error)." Instead, a TCP disconnect request is issued through the TCP Offload Disconnect Handler. Upon receiving the TCP disconnect request, if the connection is an RDMA connection, then the miniport should perform both RDMA closing and TCP closing.

The RNIC miniport never sends out a TCP FIN automatically by itself without being issued a graceful disconnect request.

The RNIC miniport sends out a TCP RST if needed. As soon as a TCP RST is sent or received, the RNIC miniport indicates an abortive disconnect event to the host stack through the TCP Offload Event Handler.

If the RNIC needs to send out an RDMA Terminate Message, then it should not set the FIN bit of that message, nor should it send out a TCP FIN automatically after the Terminate Message.

For the RDMA Chimney architecture, Terminate Offload is only called after the TCP connection associated with the RDMA connection has been completely closed in both directions or aborted. This implies that Terminate Offload is only called when the QP is in the Idle State, in the Error State, or in part of the Closing State.

The TCP Disconnect Request Handler is used by the TCP software stack to issue a graceful or an abortive disconnect request to the RNIC 308's miniport driver. The TCP Disconnect Event Handler is used by the miniport driver to indicate a graceful or an abortive disconnect event to the TCP software stack. In the context of RDMA offload, the software stack is notified through this event handler about connection status, and it then performs RDMA state transitions accordingly.

Figure 10:
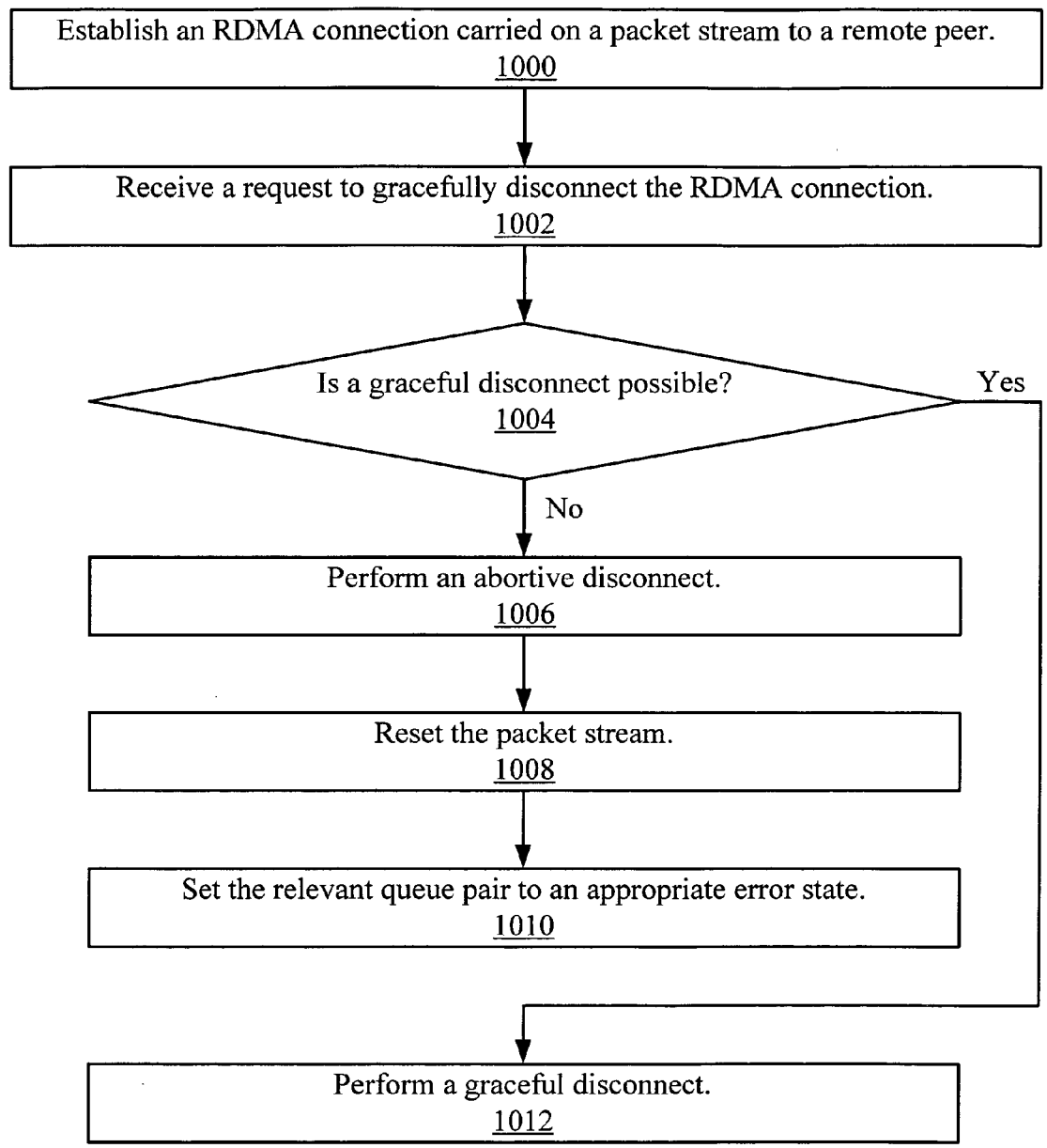
FIG. 10 is a flowchart of a method for closing an RDMA connection.

As a first illustration of these concepts, FIG. 10 presents an overview of the procedure for handling a graceful disconnect request. After an RDMA connection is established (step 1000), the RNIC miniport is called to perform a TCP graceful disconnect (step 1002).

If current QP conditions allow the miniport to perform a graceful LLP (lower layer protocol) disconnect (test in step 1004), then the RNIC follows the semantics of a TCP graceful disconnect (step 1012). Briefly, this could involve sending out a TCP FIN and completing the graceful disconnect request with STATUS_SUCCESS if an ACK is received for the FIN, else completing it with IO_TIMEOUT.

If current QP conditions do not allow the miniport to perform a graceful LLP disconnect, then the miniport initiates an abortive disconnect (step 1006) by performing a TCP Reset (step 1008) and moving the QP to the Error state (step 1010). Moreover, the miniport indicates a TCP abortive disconnect event to the software stack and completes the original graceful disconnect request with STATUS_ABORTED.

If during the process of performing a graceful LLP disconnect, some RDMA conditions occur that require the miniport to abort the LLP connection immediately, then the miniport resets the connection, signals an abortive disconnect event to the software stack, and completes the original graceful disconnect request with STATUS_ABORTED.

The miniport can use the RDMAC verb spec to determine whether the current RDMA QP conditions allow a graceful LLP disconnect or not. The miniport can also use the RDMAC verb spec to determine the RDMA state transitions for all cases.

When the RNIC miniport is called to perform a TCP abortive disconnect, this is considered the equivalent of "Modify QP(RTS→Error)."

The miniport sends out a TCP RST immediately and follows the TCP semantics of performing an abortive disconnect.

The miniport moves the QP from RTS to Error and follows the RDMAC verb spec for RDMA processing.

When a graceful disconnect event is signaled by the miniport driver to the host OS through the TCP Disconnect Event Handler:

For RDMA Chimney, as soon as a miniport receives a TCP FIN from the remote peer, it should follow the TCP semantics: Indicate a graceful disconnect event to the software stack and send out an ACK for the TCP FIN immediately.

For RDMA Chimney, the miniport performs RDMA processing according to the RDMAC verb spec after it receives a TCP FIN from the remote peer.

The host OS performs processing in both the RDMA layer and the TCP layer once it receives the indication of a graceful disconnect event from the RNIC miniport driver.

When an abortive disconnect event is signaled by the miniport driver to the host OS through the TCP Disconnect Event Handler, the RNIC miniport driver applies normal TCP semantics. Briefly: If a TCP RST is received from the remote peer, indicate this event; If the connection is lost (times out), indicate this event. If the RNIC 308 wants to send out an RST for whatever reason, indicate this event. For RDMA Chimney, if the miniport needs to perform an abortive LLP close due to RDMA conditions, then the miniport should do so. The miniport is allowed to send out a TCP RST by itself. As soon as the LLP connection is abortively closed, the miniport indicates this abortive disconnect event back to the host.

These are definitions of the semantics and rules of the TerminateOffload call for the RDMA Chimney offload architecture.

TerminateOffload is only called after the TCP connection associated with the RDMA connection is fully closed or reset.

The above point implies that TerminateOffload is only called when the QP is in the Error State, the Idle State, or part of the Closing State. "Part of the Closing State" means that the LLP has been completely closed, the QP is still flushing RQ, and it is still in the Closing State.

The RDMA Offload state block is chained as a dependency block of the TCP offload state block for the TerminateOffload request that is made on an RDMA Chimney.

Upon completion of a TerminateOffload call, TCP-delegated states are uploaded back to the host stack through the TCP offload state block. However, for the RDMA states, the miniport is not required to upload any states back to the host stack.

Conceivably, an RNIC 308 uses some internal data structures to keep track of an offloaded RDMA connection (e.g., MiniportOffloadContext). The TerminateOffload call allows the miniport to clean up those data structures. After the TerminateOffload request is issued to the miniport, no more reference to the MiniportOffloadContext is made by the host stack. Typically, that context is gone after the TerminateOffload call is complete.

This TerminateOffload call is a generic Chimney offload API. It is not designed to clean-up RDMA specific resources, such as QP, CQ, STags, etc. Destroy QP and Destroy CQ can be called for that purpose. Destroy QP, Destroy CQ, and other calls are made after the TerminateOffload call is made.

Figure 11:
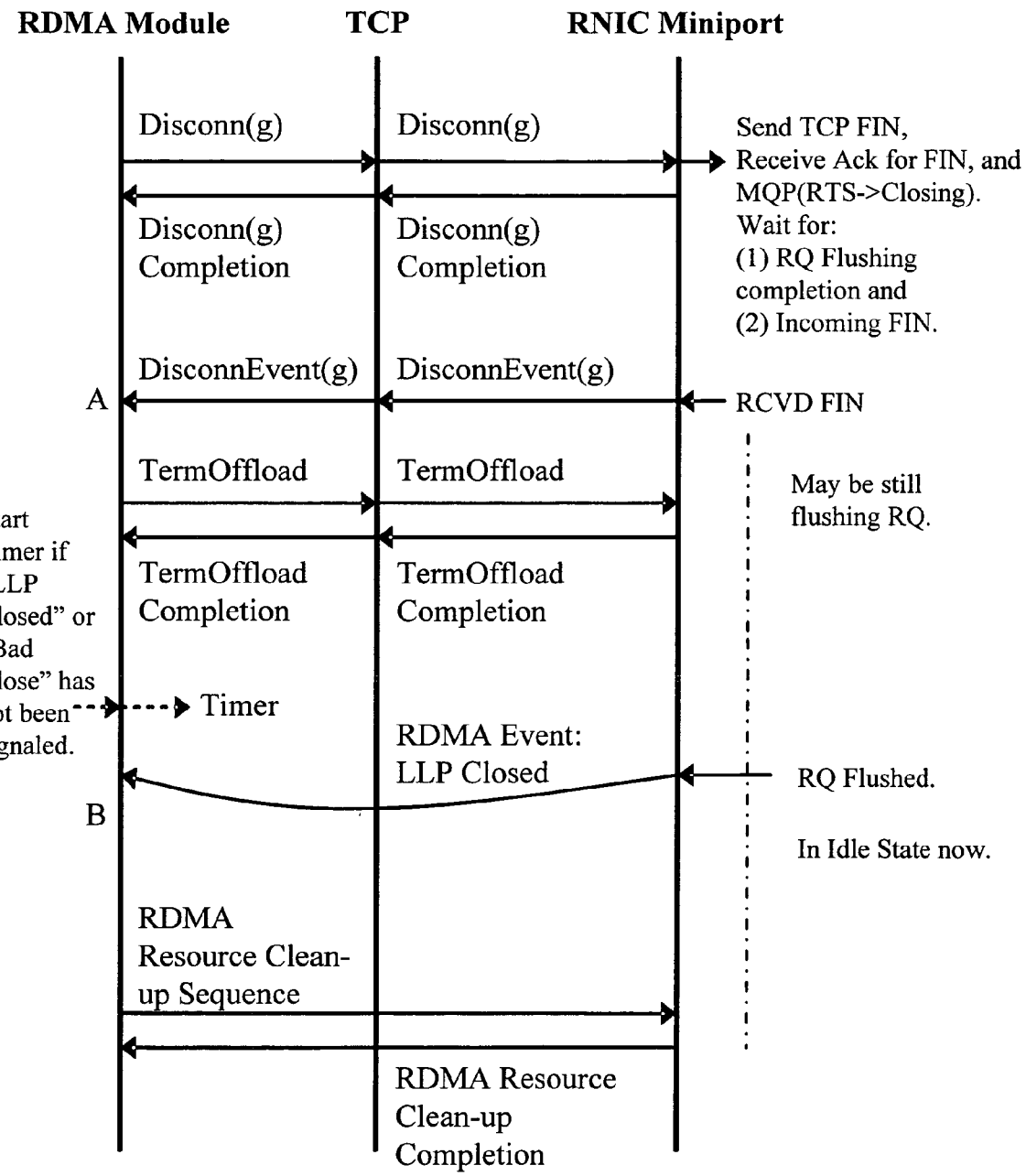
FIG. 11 is a workflow diagram of a method for a locally initiated graceful close of an RDMA connection.

To more fully explain the above concepts, FIGS. 11 through 20 illustrate the following possible RDMA closing and error scenarios:

The local consumer initiates a graceful close with no errors before and during the closing process (FIG. 11).

Figure 12:
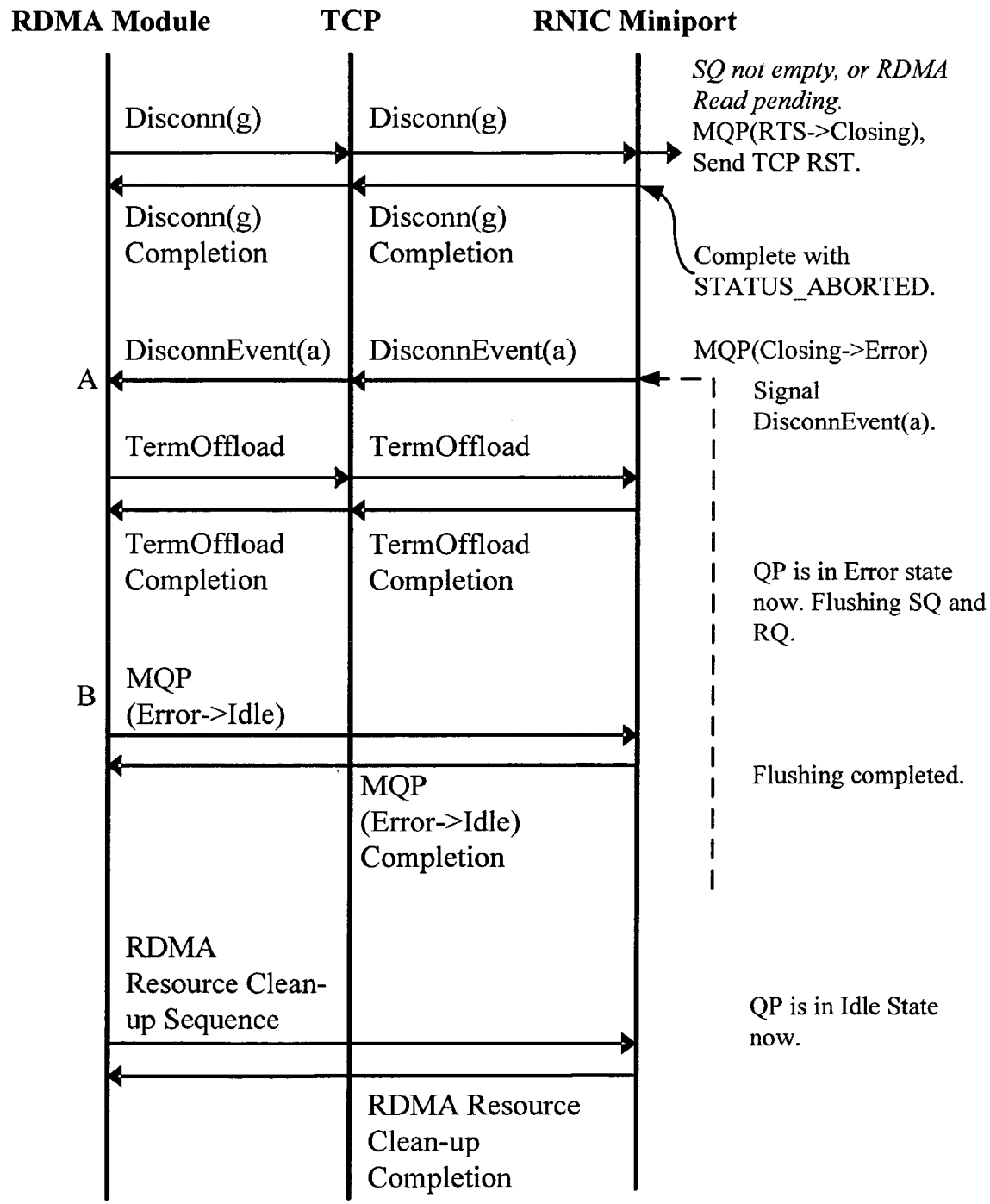
FIG. 12 is a workflow diagram of a method for a locally initiated graceful close of an RDMA connection when the send queue is not empty.

The local consumer initiates a graceful close, but there are pending Work Requests on the SQ, or there are incoming RDMA Read requests pending (FIG. 12).

Figure 13:
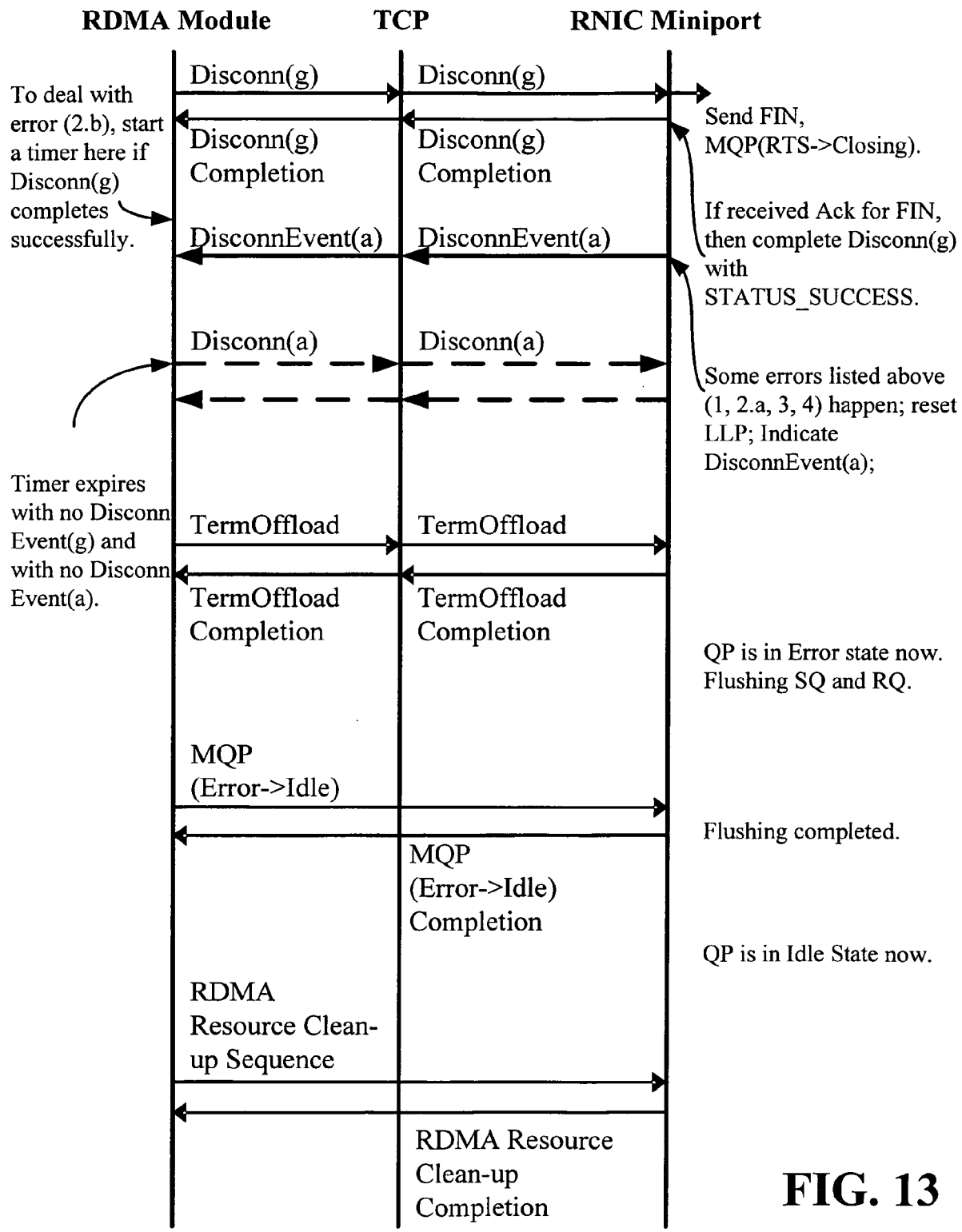
FIG. 13 is a workflow diagram of a method for a locally initiated graceful close of an RDMA connection with errors.

The local consumer initiates a graceful close, and there are no errors when this request is made. However, errors occur during the LLP close process (FIG. 13).

Figure 14:
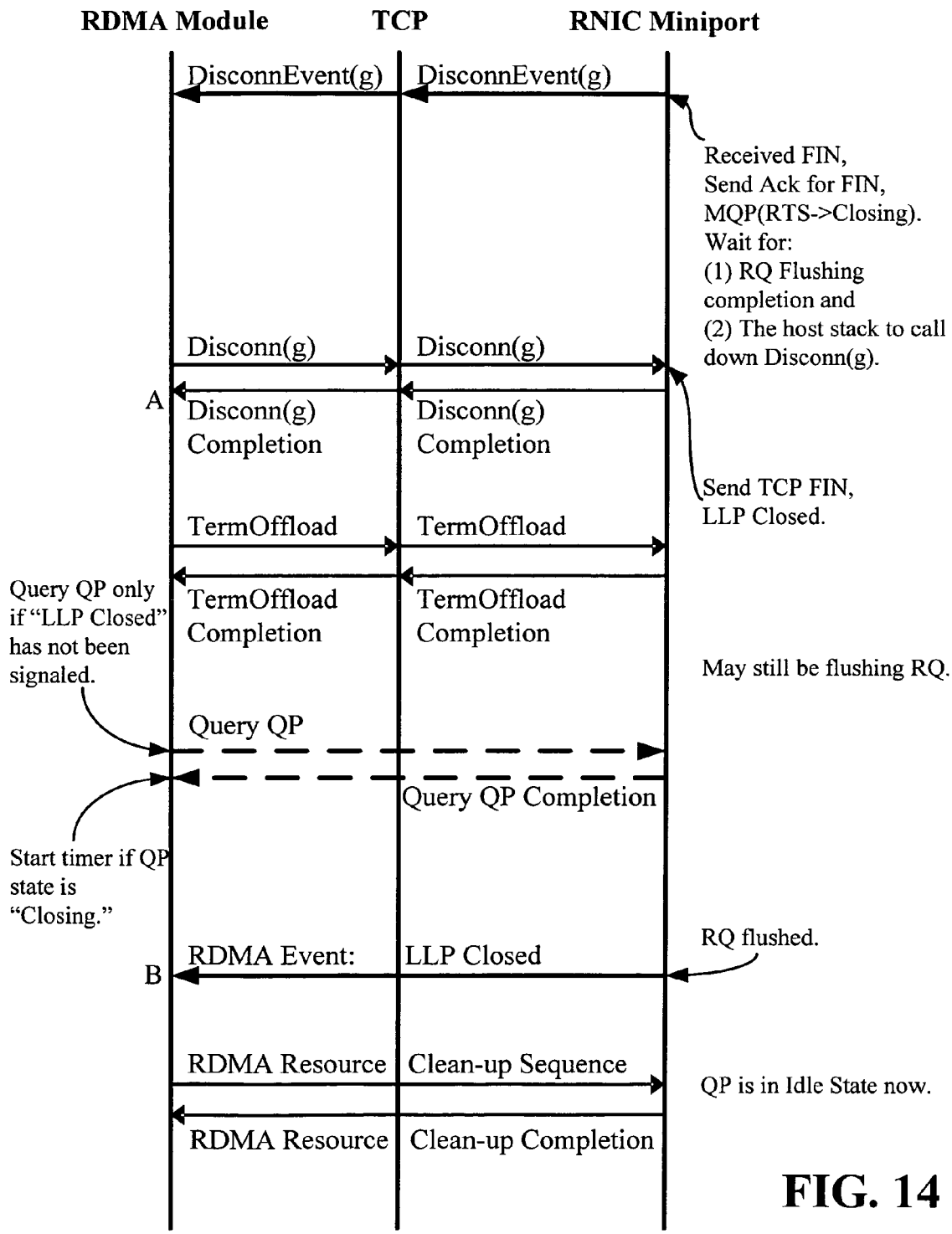
FIG. 14 is a workflow diagram of a method for a remotely initiated graceful close of an RDMA connection.

The remote peer initiates a graceful close with no errors before and during the closing process (FIG. 14).

Figure 15:
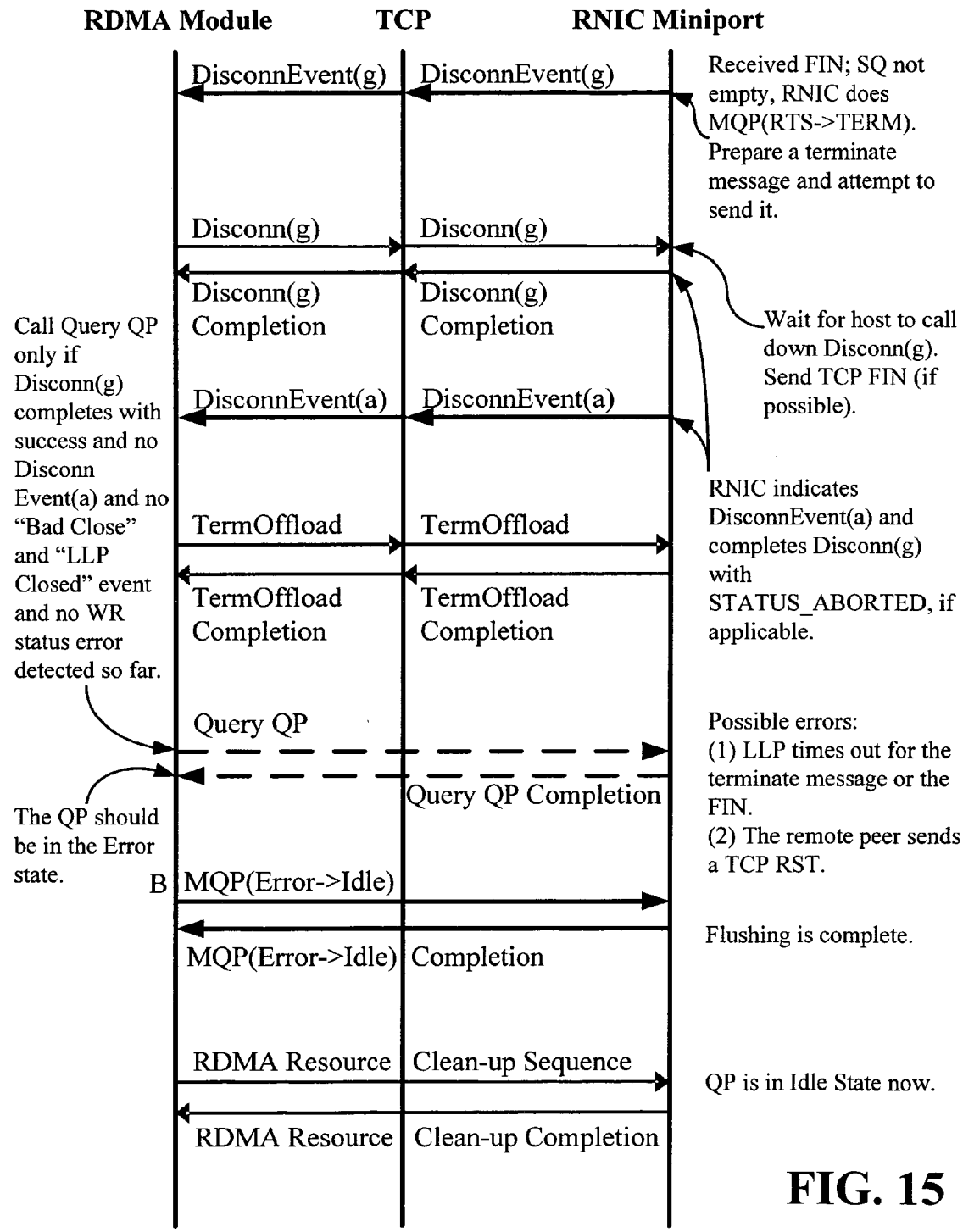
FIG. 15 is a workflow diagram of a method for a remotely initiated graceful close of an RDMA connection when the local send queue is not empty.

The remote peer initiates a graceful close with local errors at the time this request is received. A Terminate message is sent (if possible), and an attempt is made to gracefully close the LLP (FIG. 15).

Figure 16:
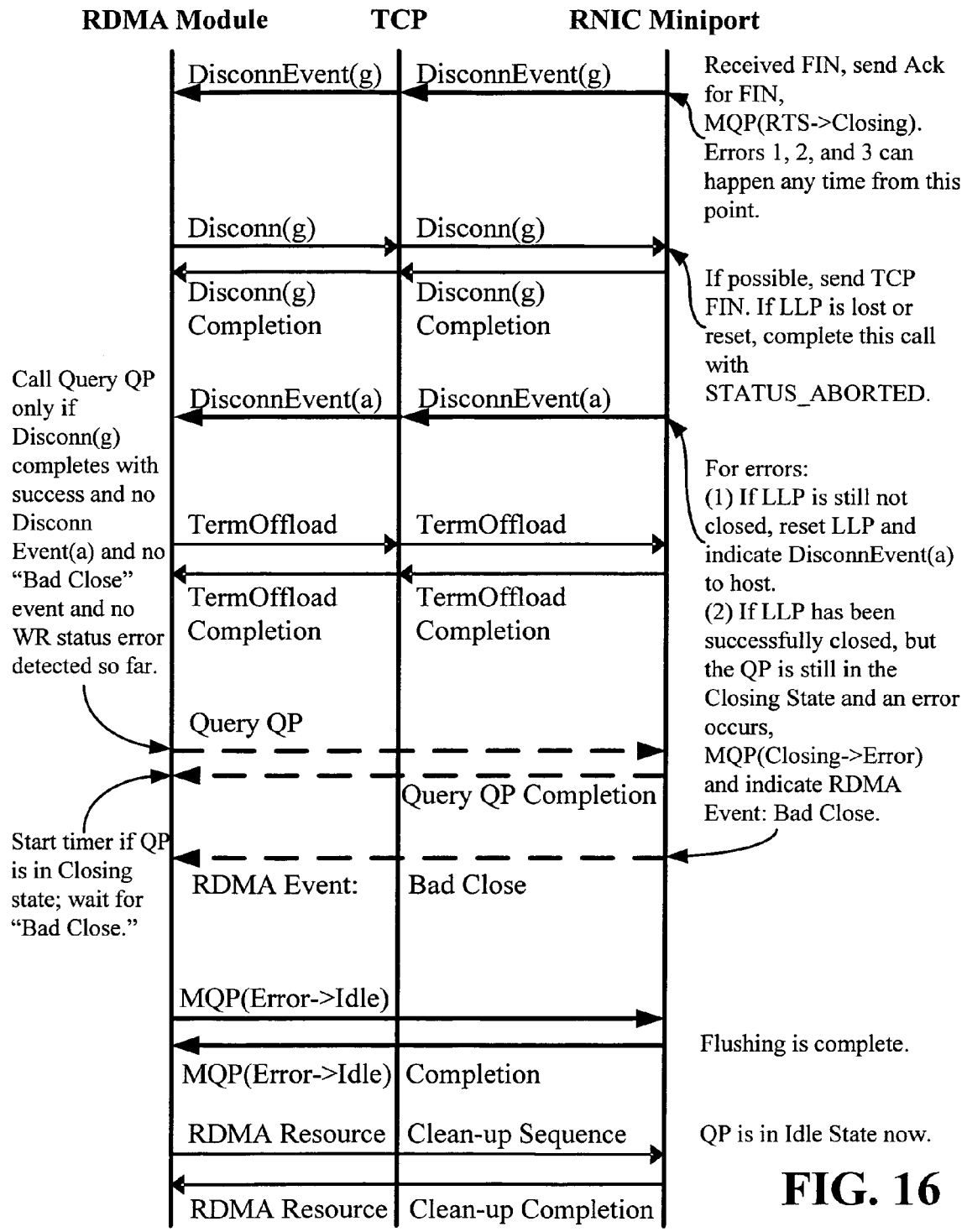
FIG. 16 is a workflow diagram of a method for a remotely initiated graceful close of an RDMA connection with errors.

The remote peer initiates a graceful close with no local errors when this request is received, but errors occur during the closing process (FIG. 16).

Figure 17:
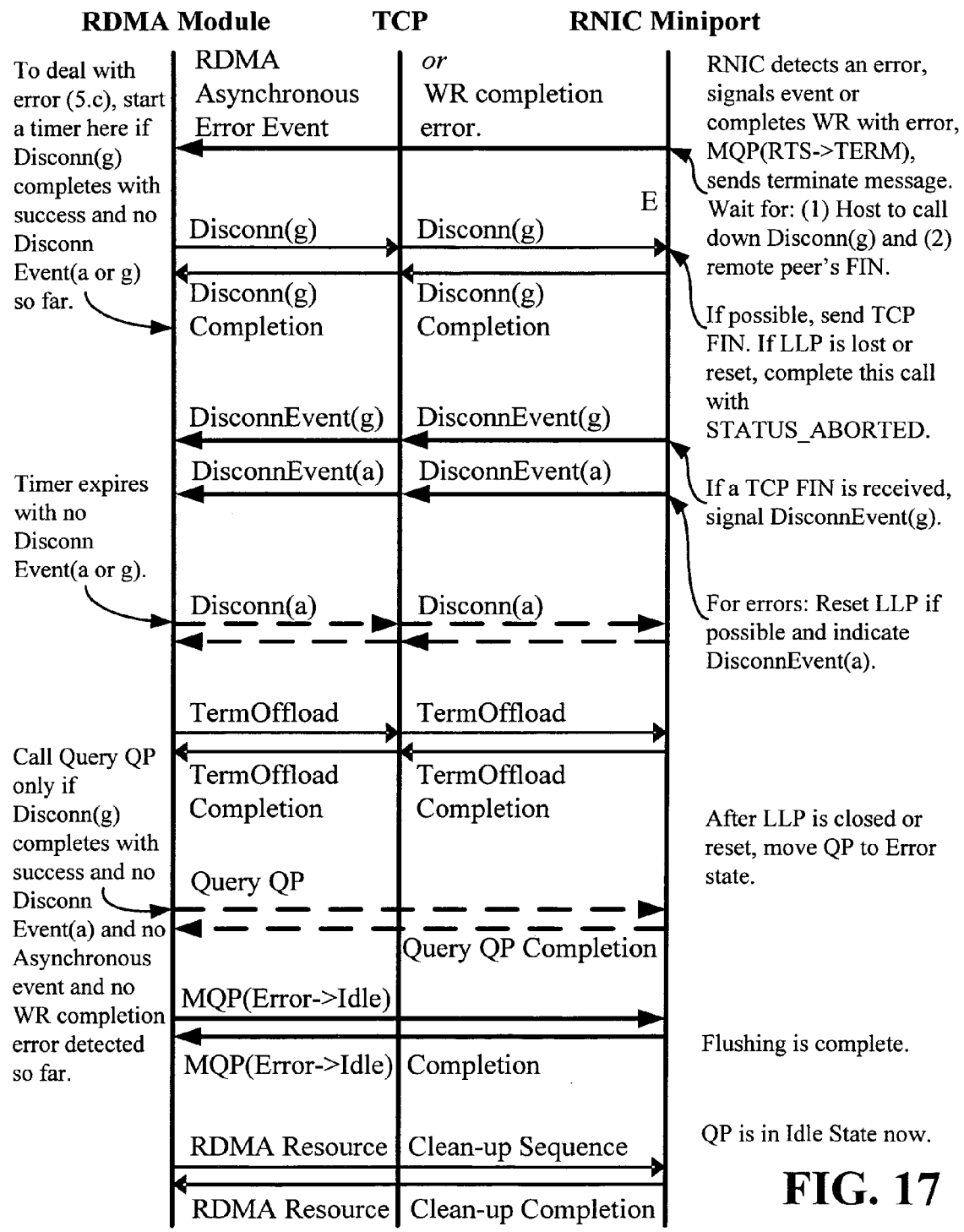
FIG. 17 is a workflow diagram of a method for abnormally closing an RDMA connection when errors are detected.

The local RNIC 308 initiates an abnormal close because of RDMA errors. A Terminate message is sent (if possible), and an attempt is made to gracefully close the LLP (FIG. 17).

Figure 18:
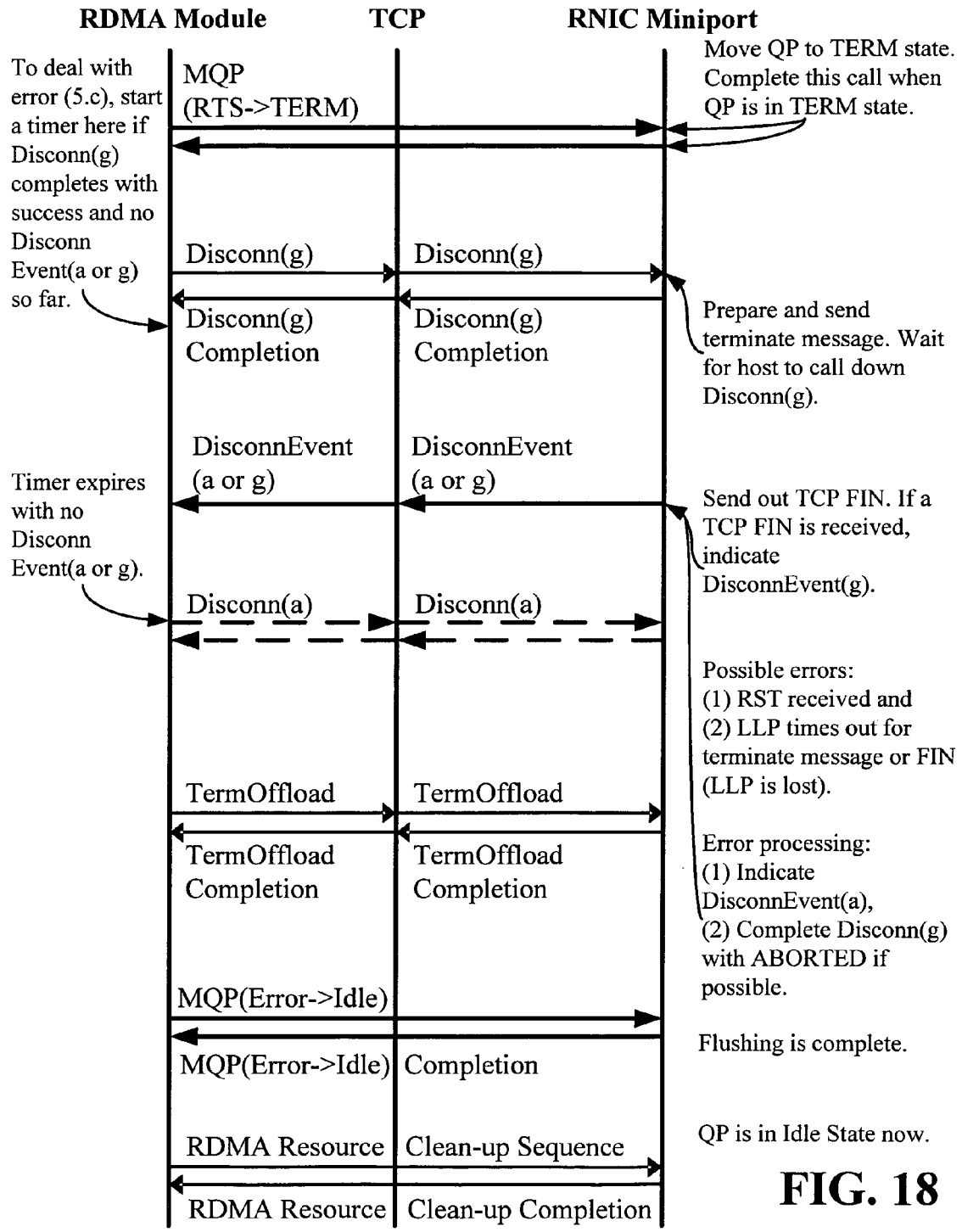
FIG. 18 is a workflow diagram of a method for a locally initiated abnormal close of an RDMA connection going through the Terminate state.

The local consumer initiates an abnormal close by calling "Modify QP(RTS→Term)." A Terminate message is sent (if possible), and an attempt is made to gracefully terminate the LLP (FIG. 18).

Figure 19:
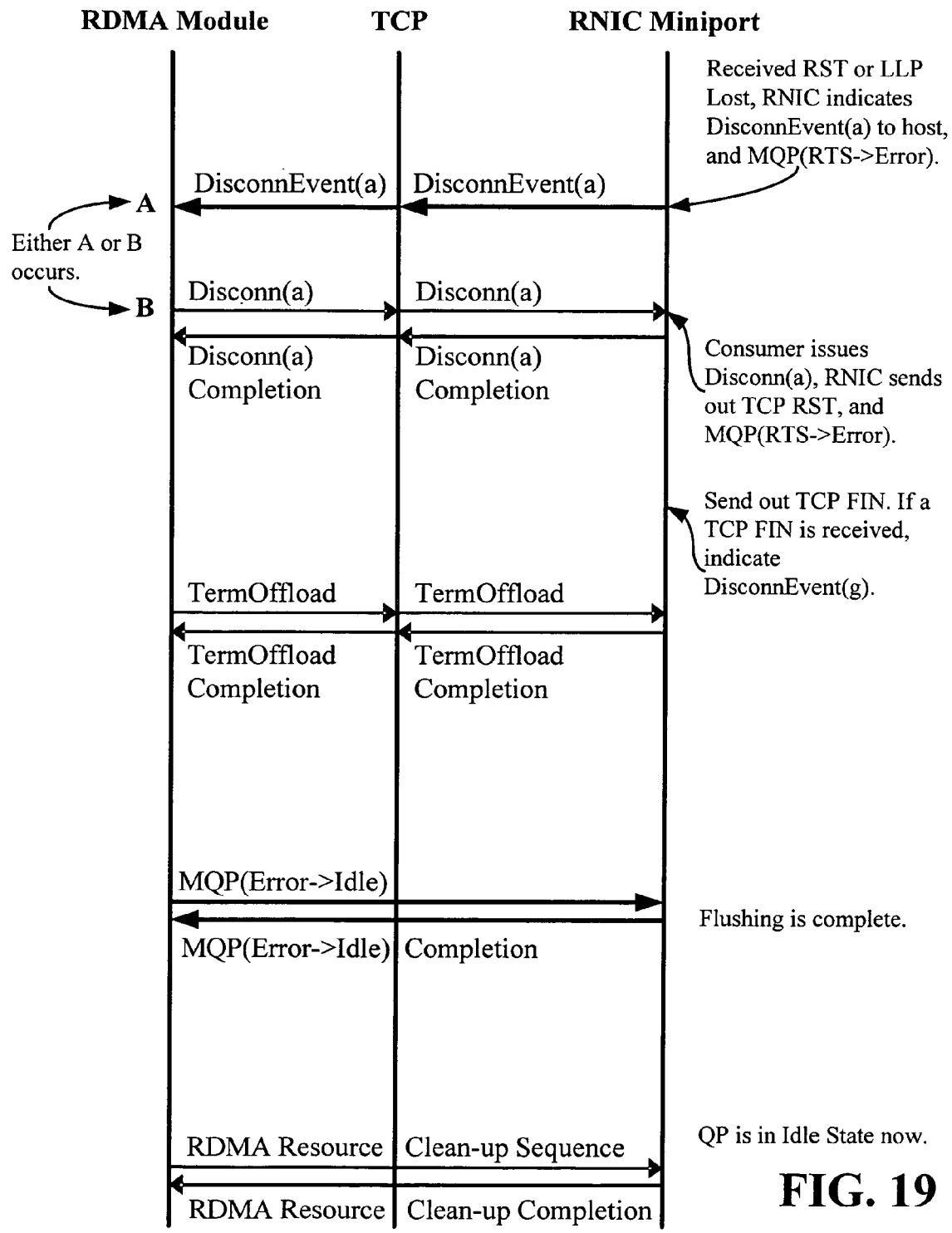
FIG. 19 is a workflow diagram of a method for a locally initiated abnormal close of an RDMA connection not going through the Terminate state.

The local RNIC 308 or the consumer initiates an abnormal close without attempting to send the Terminate message. The LLP is abortively closed (via a TCP RST). It is possible that the LLP has already been lost (FIG. 19).

Figure 20:
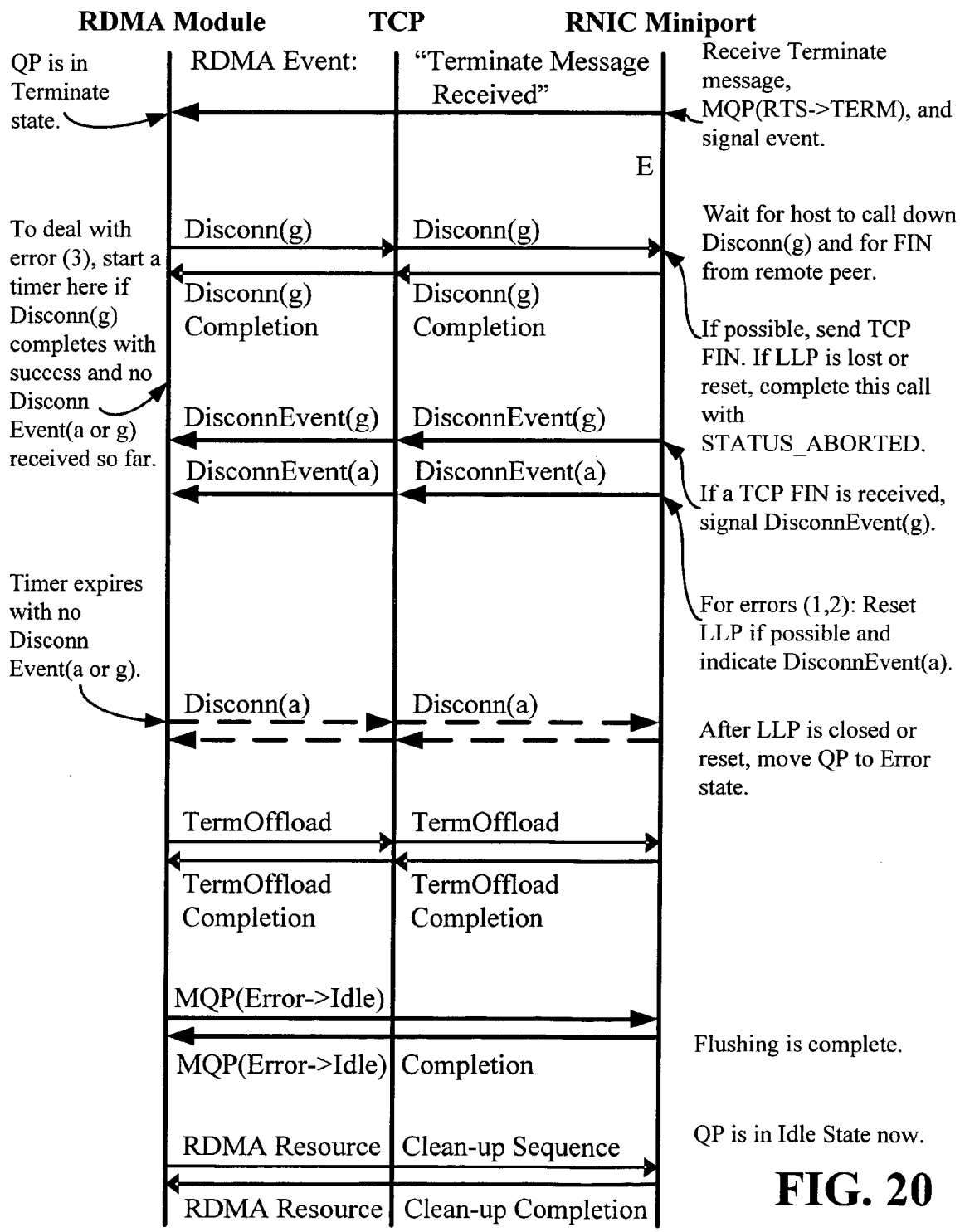
FIG. 20 is a workflow diagram of a method for a remotely initiated abnormal close of an RDMA connection.

The remote peer initiates an abnormal close with a Terminate message. An attempt is made to gracefully close the LLP (FIG. 20).

The remote peer initiates an abnormal close by sending a TCP RST. No Terminate message is sent or received by the local peer. The LLP connection is abortively closed (no Figure).

The following abbreviations are used in FIGS. 11 through 20 and in the accompanying text:

Disconn(g): a graceful disconnect request.
Disconn(a): an abortive disconnect request.
DisconnEvent(g): a graceful disconnect event.
DisconnEvent(a): an abortive disconnect event.
TermOffload: the Terminate offload call.
RCVD: received.
MQP(A→B): the Modify QP call, from State A to State B.
TermMsg: the Terminate Message.
TERM: the Terminate State.
Compl: Completed, Completion, Completion Routine, etc.

In FIGS. 11 through 20:

Calls from the RDMA Module 300 to the TCP module are made through the TLNPI interface.

Calls from the TCP module to the RNIC miniport are made through the TCP offload handlers (i.e., the RNIC miniport TCP offload dispatch routines).

Calls from the RDMA Module 300 to the RNIC miniport are made through the RDMA offload handlers (i.e., the RNIC miniport RDMA offload dispatch routines).

Up-calls from the RNIC miniport to the TCP module are made through the TCP offload event handlers (i.e., the RNIC miniport TCP offload up-call routines).

Up-calls from the TCP modules to the RDMA Module 300 are made through the TLNPI interface.

Up-calls from the RNIC miniport to the RDMA Module 300 are made through the RDMA offload Asynchronous Event Handler.

Some of the actions performed within a miniport may be performed in parallel instead of sequentially as shown in the Figures.

For FIGS. 11 through 20, the Terminate Offload call is shown as being made after the connection has been completely closed or reset. While this is the most common case, for a number of reasons the Terminate Offload call may happen before the connection has been completely closed or reset. The miniport follows the semantics defined above to process this case. This case is no different than an LLP abortive disconnect.

FIG. 11: The local consumer initiates a graceful close with no errors before and during the closing process. To initiate a close request on an RDMA connection, the user should wait for all outstanding Work Requests on the local SQ to complete and for all Remote Read Work Requests to complete as well. This enables the RNIC 308 to perform a graceful close. The user of WSK exchanges ULP-specific messages with the remote peer to make sure that read Work Requests from the remote side have been completed.

The detailed process is:

(1) The RDMA Module 300 makes a graceful disconnect request to the TCP layer which calls down to the RNIC miniport to request a graceful disconnect. Because the RNIC miniport knows that this is an RDMA connection, it sends a TCP FIN, modifies the QP state from RTS to Closing, and waits for an ACK for the TCP FIN. After the miniport receives the ACK for the FIN and when the QP is in the Closing state, the RNIC miniport completes this Disconn(g) call.

(2) The RNIC 308 begins flushing the RQ in the Closing State and waits for the remote peer to send a FIN.

(3) The remote peer sends a FIN. The RNIC miniport immediately indicates DisconnEvent(g) to the TCP stack which then indicates DisconnEvent(g) to the RDMA Module 300.

(4) At point A in FIG. 11, the RDMA Module 300 knows that the LLP has been successfully and completely closed. The RDMA Module 300 then calls down to the TCP layer to request "Terminate Offload."

(5) In response to the Terminate Offload, the RNIC miniport first terminates the TCP offload by applying TCP chimney semantics (upload TCP delegated states, etc) and then performs Terminate Offload for the RDMA chimney by applying the semantics defined above.

(6) When the Terminate Offload completes, the QP could be in one of two possible, non-error states: Closing State or Idle State. The QP may still be in the closing state because it is flushing the RQ. If the RDMA Module 300 was not signaled with "LLP Closed" for this non-error case, then a timer is started, and the RDMA Module 300 waits for the RDMA event "LLP Closed."

(7) As soon as the RNIC 308 finishes flushing the RQ and completely closes the LLP connection, the QP is moved to the Idle state. According to the verb spec, an RDMA event "LLP Closed" must be generated by the RNIC 308. This is shown in FIG. 11 as point B. Note that point B can happen before or after the TermOffload call.

(8) At point B, the RDMA Module 300 knows that the QP is in the idle state. If TermOffload has already been called and completed on this connection, then the RDMA Module 300 begins the "RDMA Resource Clean-up Sequence."

(9) In this last step, RDMA resources that are related to this connection are cleaned up. This sequence is performed according to the dependency graph of the verb spec.

Note: If some serious problems happened to the RNIC 308 that prevent it from flushing the RQ successfully, then the RDMA Module 300 is not signaled with the RDMA event "LLP Closed," and the QP is hanging in the Closing state. The RDMA Module 300 does not wait forever for this event: It starts the RDMA resource destroy sequence when a timer expires.

FIG. 12: The local consumer initiates a graceful close, but there are pending Work Requests on the SQ, or there are incoming RDMA Read requests pending. According to the RDMAC verb spec, "the RNIC MAY cause a transition to the Closing state which is immediately followed by a transition to the Error state (due to the SQ being non-empty)." Based on this text and on the overall chimney offload architecture, an RNIC miniport does the following:

(1) Moves the QP to the Closing State.

(2) Resets the TCP connection (by sending out a TCP RST).

(3) Completes the original graceful disconnect request with STATUS_ABORTED.

(4) Moves the QP to the Error State and begins flushing the SQ and the RQ.

(5) Indicates an abortive disconnect event to the TCP stack.

At point A in FIG. 12, the RDMA Module 300 knows that the connection has been reset (aborted), and it calls down Terminate Offload. It also knows that the QP is in the Error state.

At point B in FIG. 12, the RDMA Module 300 calls "Modify QP(Error→Idle)." If the QP is still flushing, then the miniport driver returns STATUS_PENDING to the RDMA Module 300 upon a "Modify QP(Error→Idle)" request. Once the QP has completed flushing, the miniport driver completes the original "Modify QP(Error→Idle)" request with STATUS_SUCCESS. Otherwise, if the miniport driver deems that the RNIC 308 hardware is taking too long to flush (or is being non-responsive), then the miniport driver can complete the original "Modify QP(Error→Idle)" request with a special error status (STATUS_ABORTED). Regardless of the completion status of this request, the host stack begins the RDMA resource destroy sequence which includes a DestroyQP call.

FIG. 13: The local consumer initiates a graceful close, and there are no errors when this request is made. However, errors occur during the LLP close process. The errors that could happen during the LLP close process could be LLP errors or RDMA errors. They are:
(1) The local peer receives a TCP RST from the remote peer.
(2) The LLP close times out. This could be one of the following:
  (2.a) After sending out the TCP FIN, the ACK for the FIN never comes back.
  (2.b) After sending out the TCP FIN and receiving the ACK for the FIN, the RNIC 308 and the RDMA Module 300 expect that the remote peer will shortly send back a TCP FIN. The RNIC 308 waits for this incoming TCP FIN to complete the LLP close and to move the QP to the Idle state. As soon as a TCP FIN is received, the RNIC 308 indicates a DisconnEvent(g) back to the host stack and moves the QP to the Idle state. However, the remote peer may never send the FIN (or anything) back. To deal with this, the RDMA Module 300 fires a timer to wait for that DisconnEvent(g), and if that timer expires, then the RDMA Module 300 calls Disconn(a) to reset the connection.
(3) After sending out the TCP FIN, any data come in. This is classified as an error case by the verb spec.
(4) Somehow, Work Requests are posted on to the SQ/RQ when the QP is in the Closing state. This error condition is outlined by the RDMA verb spec.
(5) For a number of reasons, the host stack calls Terminate Offload before the LLP connection is completely closed.

Whenever any of the above errors occurs, the RNIC 308 resets the LLP connection, indicates an abortive disconnect event to the TCP host stack, and moves the QP to the Error state.

FIG. 14: The remote peer initiates a graceful close with no errors before and during the closing process. The remote peer initiates a graceful close request by sending a TCP FIN. If the local peer's SQ is empty and there are no incoming RDMA Read operations pending, then the RNIC 308 accepts the graceful disconnect request and does the following:
(1) Sends an ACK to the remote peer to acknowledge the TCP FIN.
(2) Modifies QP(RTS→Closing) and starts flushing the RQ.
(3) Indicates DisconnEvent(g) to the TCP host stack.
(4) Shortly after this indication, the TCP stack calls Disconn (g) down to the RNIC miniport.
(5) As soon as the miniport is called with Disconn(g), it sends out a FIN to the remote peer and completes this Disconn(g) after it receives an ACK for the FIN.
(6) Once the RQ flushing is complete and the LLP has been completely closed, it moves the QP to the Idle state. According to the RDMAC verb spec, the miniport must indicate an RDMA Event "LLP Closed" to the consumer. The RDMA Module 300 is waiting for this event to know that the QP is in the Idle state.

At point A in FIG. 14, the RDMA Module 300 knows that the LLP has been completely closed so that it can call down Terminate Offload. As soon as the Terminate Offload completes, the RDMA Module 300 calls Query QP (if necessary) to get the current state of the QP. If the result shows that the QP is in the Closing State, then the RDMA Module 300 starts a timer to wait for the "LLP Closed" event. At point B, the RDMA event "LLP Closed" is signaled to the RDMA Module 300 so that the RDMA Module 300 knows that the QP is in the Idle state, and the RDMA Module 300 starts the RDMA resource clean-up sequence. Point B may happen at any time after point A.

Note: If some serious problems happened to the RNIC 308 that prevent it from flushing the RQ successfully, then the RDMA Module 300 is not signaled with the RDMA event "LLP Closed," and the QP is hanging in the Closing state. The RDMA Module 300 does not wait forever for this event: It starts the RDMA resource destroy sequence when a timer expires.

FIG. 15: The remote peer initiates a graceful close with local errors at the time this request is received. A Terminate message is sent (if possible), and an attempt is made to gracefully close the LLP. Here, a FIN is received (meaning that the remote peer is requesting a graceful close), but the local SQ is not empty because Work Requests are pending. This is defined as an error case by the verb spec. The QP is moved to the Terminate state first, and a terminate message is generated and sent out by the RNIC 308 if possible. An attempt is made to gracefully close the LLP.

Note that the RDMA Module 300 may call Query QP in this case because it needs to differentiate this case from the cases of FIGS. 14 and 16. For those two cases, the QP should be in the Closing state, and a timer is needed to wait for the RNIC 308 to signal either a "Bad Close" or an "LLP Closed" RDMA event. In the present case, the Query QP returns the Error state, and the processing at point B of FIG. 15 is performed.

FIG. 16: The remote peer initiates a graceful close (a TCP FIN is received) with no local errors when this request is received (SQ is empty, and there are no RDMA Read Requests pending), but errors occur during the closing process. The errors that could happen during the LLP close process could be LLP errors or RDMA errors. They are:
(1) The local peer receives a TCP RST from the remote peer.
(2) The LLP close times out.
(3) Somehow, Work Requests are posted on to the SQ/RQ when the QP is in the Closing state. This error condition is outlined by the RDMA verb spec.

Whenever any of the above errors occurs, the RNIC 308 resets the LLP connection, indicates an abortive disconnect event to the TCP host stack, and moves the QP to the Error state.

Here are further explanations for the error processing in this case:
(1) If errors occur before the host calls down Disconn(g), then the RNIC miniport should signal DisconnEvent(a) back to the host and reset the LLP connection. When it is called to execute the Disconn(g) request, it completes the request with STATUS_ABORTED.
(2) If errors occur during the execution of the Disconn(g), the RNIC miniport completes it with STATUS_ABORTED and indicates DisconnEvent(a) back to host.
(3) After Disconn(g) has been completed successfully (which means that the LLP has been completely closed), the QP may be still flushing the RQ (which means that it is still in the Closing state), and errors can occur. According to the verb spec, the RNIC must move the QP to the Error state and signal the event "Bad Close." The RDMA Module 300 is notified by this event that the QP is in the Error state and responds accordingly.

Note that in the no-error case (see FIG. 14 and accompanying text), the RNIC 308 signals the RDMA event "LLP Closed" after it successfully moves the QP state from Closing to Idle. So, the "Bad Close" event differentiates the present case from that case.

Also note that the RDMA verb spec requires that the RNIC 308 signal either "LLP Lost" or "LLP Reset" in case of an LLP failure. However, these two RDMA events are redundant with DisconnEvent(a). In the RDMA chimney, the RDMA Module 300 always waits on DisconnEvent(a) and ignores RDMA Events "LLP Lost" and "LLP Reset."

The remaining cases all involve abnormal closes. An RDMA abnormal close is initiated either by the RNIC 308 itself or by the consumer because of RDMA errors or LLP errors. During an RDMA abnormal close, the LLP connection may be closed abortively or, if possible, gracefully. Typically, a terminate message is sent or received by the RNIC 308 if conditions allow.

FIGS. 17 and 18 address cases where a local peer initiates an RDMA abnormal close. There are two sub-cases here:
(1) In the case illustrated by FIG. 17, the local peer's RNIC 308 detects RDMA operation errors on this connection and initiates an abnormal close. If the LLP is still working, then the RNIC 308 tries to send a Terminate message and moves the QP to the terminate state. (However, if the LLP is not working, then the RNIC 308 moves the QP to the Error state directly and does not send a Terminate message, a case illustrated by FIG. 19.)
(2) In the case of FIG. 18, the local peer's consumer determines that the RDMA connection should be abnormally closed and that a Terminate message should be sent to the remote peer. The consumer calls Modify QP(RTS→TERM).

FIG. 17: The local RNIC 308 initiates an abnormal close because of RDMA errors. A Terminate message is sent (if possible), and an attempt is made to gracefully close the LLP. If the RNIC 308 detects a local error and decides to initiate an RDMA abnormal close by going through the Terminate state, it performs the following actions:
(1) Notifies the host stack about the error through either one of the two ways: signaling an asynchronous event or completing a Work Request with error status.
(2) Stops all QP processing and prepares and sends the Terminate message.
(3) Waits for the host stack to call down Disconn(g) to send out a FIN. The host stack calls down Disconn(g) as soon as it (a) receives an RDMA Asynchronous Error Event, (b) polls a CQE with Error Completion status, or (c) receives a DisconnEvent(g) indication.
(4) If the remote peer sends a FIN, the RNIC 308 sends back an ACK and then notifies the host stack by DisconnEvent (g).
(5) Errors may occur at any time during the process. If any error occurs, the TCP connection is reset (if it is still there), and an DisconnEvent(a) is indicated back to the host stack. The QP is moved to the Error state. Possible errors for this process include:
(5.a) A TCP RST is received from the remote peer.
(5.b) The LLP close times out because (i) an ACK cannot be received for the FIN sent or (ii) the Terminate message cannot be sent.
(5.c) A FIN cannot be received from the remote peer. The remote peer may possibly send nothing back at all. See the discussion of error (2.b) accompanying FIG. 13.

Note that DisconnEvent(g) or DisconnEvent(a) may happen any time after the RNIC 308 indicates an asynchronous error and sends the Terminate message.

Note that in FIG. 17, point E indicates that a DisconnEvent (g) or a DisconnEvent(a) might also be signaled by the RNIC miniport at this point. The miniport signals DisconnEvent(g) as soon as it receives a TCP FIN from the remote peer and signals DisconnEvent(a) as soon as the LLP is reset or lost. Both of these events may happen before or after the host stack calls down Disconn(g). This is the implication of point E.

After the Terminate Offload call completes, the RDMA Module 300 may call Query QP to query the current state of the QP if necessary. Query QP is called to differentiate this case from the non-error closing case.

FIG. 18: The local consumer initiates an abnormal close by calling "Modify QP(RTS→Term)." A Terminate message is sent (if possible), and an attempt is made to gracefully terminate the LLP. The local consumer may initiate an abnormal RDMA close at any time. There are two ways to do this: (1) call "Modify QP(RTS→TERM)" and (2) call Disconn(a). The first case asks the RNIC 308 to send out an RDMA Terminate message if possible, and an attempt is made to gracefully close the LLP connection. The second case does not send a Terminate message, but abortively tears down the LLP connection immediately. FIG. 18 illustrates the first case.

FIG. 19: The local RNIC 308 or the consumer initiates an abnormal close without attempting to send the Terminate message. The LLP is abortively closed (via a TCP RST). It is possible that the LLP has already been lost. This case goes directly to the Error state by abortively tearing down the LLP connection. There are three possible cases for this:
(1) The local consumer issues a Disconn(a). This is marked as point B in FIG. 19.
(2) The LLP is lost or reset, and the local RNIC 308 moves the QP state from RTS to Error.
(3) The RNIC 308 decides to reset the LLP immediately due to various RDMA errors and conditions.

Cases (2) and (3) are indicated to the host stack with a DisconnEvent(a) (point A in FIG. 19).

FIG. 20: The remote peer initiates an abnormal close with a Terminate message. An attempt is made to gracefully close the LLP. Upon receiving a Terminate message, the RNIC miniport moves the QP to the Terminate state and indicates an RDMA event "Terminate message received" to the host stack. Being signaled by this event, the RDMA Module 300 calls down Disconn(g) immediately. The RNIC miniport then sends out a TCP FIN and tries to complete a graceful LLP disconnect. If the remote peer sends back a FIN, then the LLP is closed gracefully, and the QP is moved to the Error state. However, the following errors could happen at any time during this process:
(1) The LLP times out waiting for the TCP FIN or the local RNIC 308 never receives an ACK for the FIN sent.
(2) The local RNIC 308 receives a TCP RST from the remote peer.
(3) After sending out a TCP FIN, the local RNIC 308 expects the remote peer to send back a TCP FIN shortly. However, this FIN may never come in. This is the same error 2.b discussed above with respect to FIG. 13.

During the entire process, if the RNIC miniport receives a TCP FIN from the remote peer, it indicates a DisconnEvent (g) to the host stack, and if it receives a TCP RST or if it sends a TCP RST, it indicates a DisconnEvent(a) to the host stack.

Note that in FIG. 20, a DisconnEvent(g) or a DisconnEvent (a) might also be signaled by the RNIC miniport at point E.

No Figure: The remote peer initiates an abnormal close by sending a TCP RST. No Terminate message is sent or received by the local peer. The LLP connection is abortively closed.

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that some implementation details, such as the detailed semantics and procedures of the RDMA Chimney architecture, are determined by specific situations. Although the environment of the invention is described in terms of software modules or components, some processes may be equivalently performed by hardware components. Therefore, the invention as described herein contemplates all such embodiments as may come within the scope of the following claims and equivalents thereof.

We claim:

1. In a computing device with a plurality of processors, a method for distributing input/output (I/O) completion events among at least a subset of the plurality of processors, the method comprising:

creating an array associated with an interface of a plurality of interfaces, the array comprising a plurality of descriptors, wherein each descriptor in the plurality of descriptors is respectively and uniquely associated with one processor of the plurality of processors and stores a unique completion event handler identifier (ID) for the one processor;

when a remote direct memory access (RDMA) connection carried over a packet stream is established, determining a processor of the plurality of processors on which to create an I/O completion queue for the RDMA connection, retrieving a unique completion event handler ID for the processor from a descriptor of the plurality of descriptors in the array associated with the interface using an identifier of the processor to identify a location of the unique completion event handler ID for the processor in the array, and employing the unique completion event handler ID for the processor of the plurality of processors to associate the I/O completion queue with the processor;

receiving an I/O completion event into the I/O completion queue;

processing, by the processor associated with the I/O completion queue, the I/O completion event;

associating a completion callback function with the processor;

wherein the processing, by the processor associated with the I/O completion queue, of the I/O completion event is performed, at least in part, by the completion callback function associated with the processor; and when a condition of a queue pair associated with the RDMA connection allows for a graceful disconnect of the packet stream, gracefully disconnecting the packet stream.

2. The method of claim 1 wherein the interface comprises an I/O interface of a plurality of I/O interfaces.

3. The method of claim 1 wherein the I/O completion event is an RDMA completion event.

4. The method of claim 1 wherein determining the processor of the plurality of processors on which to create the I/O completion queue associated with the processor comprises:

deciding to associate the I/O completion queue with the processor of the plurality of processors, the deciding based, at least in part, on a load-balancing algorithm.

5. The method of claim 1 further comprising:

for at least one of the plurality of processors, associating a plurality of I/O completion queues with the at least one processor.

6. The method of claim 1 further comprising:

associating with the I/O completion queue at least one queue pair.

7. A computer storage medium having computer-executable instructions for performing a method, on a computing device with a plurality of processors, for distributing I/O completion events among at least a subset of the plurality of processors, the method comprising:

creating an array associated with an interface of a plurality of interfaces, the array comprising a plurality of descriptors, wherein each descriptor in the plurality of descriptors is respectively and uniquely associated with one processor of the plurality of processors and stores a unique completion event handler identifier (ID) for the one processor;

when a remote direct memory access (RDMA) connection carried over a packet stream is established, determining a processor of the plurality of processors on which to create an I/O completion queue for the RDMA connection, retrieving a unique completion event handler ID for the processor from the array associated with the interface using an identifier of the processor to identify a location of the unique completion event handler ID for the processor in the array, and employing the unique completion event handler ID for the processor of the plurality of processors to associate the I/O completion queue with the processor;

receiving an I/O completion event into the I/O completion queue;

processing, by the processor associated with the I/O completion queue, the I/O completion event;

associating a callback function with the processor;

wherein the processing, by the processor associated with the I/O completion queue, of the I/O completion event is performed, at least in part, by the callback function associated with the processor; and when a condition of a queue pair associated with the RDMA connection allows for a graceful disconnect of the packet stream, gracefully disconnecting the packet stream.

8. The computer storage medium of claim 7 wherein the interface comprises an I/O interface of a plurality of I/O interfaces.

9. The computer storage medium of claim 7 wherein the I/O completion event is an RDMA completion event.

10. The computer storage medium of claim 7 wherein determining the processor of the plurality of processors on which to create the I/O completion queue associated with the processor comprises:

deciding to associate the I/O completion queue with the processor of the plurality of processors, the deciding based, at least in part, on a load-balancing algorithm.

11. The computer storage medium of claim 7 further comprising computer-executable instructions for:

for at least one of the plurality of processors, associating a plurality of I/O completion queues with the at least one processor.

12. The computer storage medium of claim 7 further comprising computer-executable instructions for:

associating with the I/O completion queue at least one queue pair.

13. A system for distributing input/output (I/O) completion events among at least a subset of a plurality of processors, the system comprising:

a computing device comprising:

a plurality of processors;

an array associated with a remote direct memory access-enabled network interface card (RNIC) interface comprising a plurality of descriptors, wherein each descriptor in the plurality of descriptors is respectively and uniquely associated with one processor of the plurality of processors and stores a unique completion event handler identifier (ID) for the one processor; and a remote direct memory access (RDMA) module that, when an RDMA connection carried over a packet stream is established:

determines a processor of the plurality of processors on which to create an I/O completion queue for the RDMA connection, retrieves a unique completion event handler ID for the processor from the array associated with the RNIC interface using an identifier of the processor to identify a location of the unique completion event handler ID for the processor in the array, and employs the unique completion event handler ID for the processor of the plurality of processors to associate the I/O completion queue associated with the processor;

wherein the computing device is configured for receiving an I/O completion event into the I/O completion queue;

processing, by the processor associated with the I/O completion queue, the I/O completion event;

associating a callback function with the processor;

processing the I/O completion event, at least in part, by the callback function associated with the processor; and when a condition of a queue pair associated with the RDMA connection allows for a graceful disconnect of the packet stream, gracefully disconnecting the packet stream.

14. The system of claim 13 wherein the computing device is further configured for:

for at least one of the plurality of processors, associating a plurality of I/O completion queues with the at least one processor.

15. The method of claim 1 wherein the interface comprises a remote direct memory access (RDMA)-enabled network interface card (NIC) interface.

16. The method of claim 1, further comprising creating a new I/O completion queue, the creating of the new I/O completion queue comprises:

determining a second processor of the plurality of processors to associate with the new I/O completion queue;

retrieving a unique completion event handler ID for the processor associated with the new I/O completion queue from a descriptor in the array, the descriptor corresponding to the processor associated with the new I/O completion queue.

17. The method of claim 1 wherein a deferred procedure call executes on the processor associated with the receiving I/O completion queue to process the I/O completion event.

18. The computer storage medium of claim 7 wherein the interface comprises a remote direct memory access (RDMA) enabled network interface card (NIC) interface.

19. The system of claim 13 wherein a deferred procedure call executes on the processor associated with the receiving I/O completion queue to process the I/O completion event.

* * * * *